United States Patent

Odashima et al.

[11] Patent Number: 6,040,054
[45] Date of Patent: Mar. 21, 2000

[54] CHROMIUM-FREE, METAL SURFACE-TREATING COMPOSITION AND SURFACE-TREATED METAL SHEET

[75] Inventors: Hisao Odashima; Tomomi Takahashi, both of Okayama; Toshiyuki Shimizu, Ohtsu, all of Japan

[73] Assignee: Toyo Boseki Kabushiki Kaisha, Osaka, Japan

[21] Appl. No.: 08/791,077

[22] Filed: Jan. 29, 1997

[30] Foreign Application Priority Data

Feb. 1, 1996 [JP] Japan ................................. 8-016824
Mar. 5, 1996 [JP] Japan ................................. 8-047286

[51] Int. Cl.[7] .......................... B32B 15/08; B32B 27/08; B32B 27/18; B32B 27/30
[52] U.S. Cl. ........................ 428/413; 428/416; 428/457; 428/458; 428/463; 428/469; 428/471; 428/472; 428/472.3; 428/483; 428/515; 428/520; 428/522; 106/14.05; 106/14.12; 106/14.21; 106/14.44; 148/240; 148/243; 148/251; 148/253
[58] Field of Search ..................... 148/240, 243, 148/251, 253, 259; 106/14.12, 14.44, 14.05, 14.21; 428/457, 458, 469, 470, 471, 472, 472.3, 413, 416, 463

[56] References Cited

U.S. PATENT DOCUMENTS

| | | | |
|---|---|---|---|
| 3,869,341 | 3/1975 | Gotoda et al. | 161/270 |
| 4,147,566 | 4/1979 | Leonard | 148/6.15 R |
| 4,264,378 | 4/1981 | Oppen et al. | 148/6.15 R |
| 4,287,113 | 9/1981 | Takashina et al. | 260/33.4 EP |
| 4,289,826 | 9/1981 | Howell | 428/418 |
| 4,370,387 | 1/1983 | Ueno et al. | 428/458 |
| 4,650,526 | 3/1987 | Claffey et al. | 148/6.14 R |
| 4,656,097 | 4/1987 | Claffey et al. | 428/457 |
| 5,037,478 | 8/1991 | Okai et al. | 106/479 |
| 5,112,413 | 5/1992 | Carey et al. | 148/251 |
| 5,520,959 | 5/1996 | Tanaka et al. | 427/354 |
| 5,578,669 | 11/1996 | Odawa et al. | 524/414 |
| 5,595,611 | 1/1997 | Boulos et al. | 148/259 |

FOREIGN PATENT DOCUMENTS

| | | |
|---|---|---|
| 54-009129 | 1/1979 | Japan . |
| 62-033780 | 2/1987 | Japan . |
| 1-14278 | 1/1989 | Japan . |
| 1-149868 | 6/1989 | Japan . |
| 3-192166 | 8/1991 | Japan . |
| 3-272844 | 12/1991 | Japan . |
| 4-143296 | 5/1992 | Japan . |
| 4-153281 | 5/1992 | Japan . |
| 4-197473 | 7/1992 | Japan . |
| 5-070715 | 3/1993 | Japan . |
| 5-148432 | 6/1993 | Japan . |
| 5-222324 | 8/1993 | Japan . |
| 6-079232 | 3/1994 | Japan . |
| 7-166365 | 6/1995 | Japan . |
| 7-242792 | 9/1995 | Japan . |
| 7-252433 | 10/1995 | Japan . |

*Primary Examiner*—Vivian Chen
*Attorney, Agent, or Firm*—Kenyon & Kenyon

[57] ABSTRACT

A chromium-free composition for treating metal surface comprising (a) a hydroxyl group-containing organic resin, (b) a phosphoric acid and (c) at least one of ions and compounds of at least one metal selected from the group consisting of Cu, Co, Fe, Mn, Sn, V, Mg, Ba, Al, Ca, Sr, Nb, Y and Zn, and (d) at least one of colloids (sol) or powders of $SiO_2$, $SnO_2$, $Fe_2O_3$, $Fe_3O_4$, MgO, $ZrO_2$, $Al_2O_3$ and $Sb_2O_5$; as well as a metal sheet or metal article having thereon (i) a coating film of the chromium-free composition and optionally (ii) a coating film of a coating composition comprising an organic resin and if desired a colloid (sol) or a powder.

12 Claims, No Drawings

CHROMIUM-FREE, METAL SURFACE-TREATING COMPOSITION AND SURFACE-TREATED METAL SHEET

FIELD OF THE INVENTION

The present invention relates to a chromium-free composition for treating the surface of metals such as cold-rolled steel sheets, Zn-plated steel sheets, Zn alloy-plated steel sheets, sheets of Ni, Cu, Pb, Sn, Cd, Al, Ti or the like, steel sheets plated with these metals or with alloys of these metals, or the like, which is adapted to form thereon a corrosion-resistant film when applied and dried. The present invention also relates to a surface-treated metal sheet having a corrosion-resistant film formed thereon by applying said composition to the surface of the metals and drying the same.

PRIOR ART

In order to improve the corrosion resistance of cold-rolled steel sheets, Zn-plated steel sheets, steel sheets plated with Zn alloy such as Zn—Ni, Zn—Ni—Co, Zn—Ni—Cr, Zn—Fe, Zn—Co, Zn—Cr, Zn—Mn and the like, steel sheets plated with Ni, Cu, Pb, Sn, Cd, Al, Ti or the like or with alloys of these metals and the like, so-called chromate treatment is generally carried out to form a chromate film.

However, in view of environmental and pollution problems currently arising, there is a recent tendency to strictly control the use of chromium under a regulation.

In the foregoing situation, chromium-free anti-corrosive coating compositions have been developed.

Proposed coating materials include, for example, an emulsion polymer prepared by polymerization of a polymerizable unsaturated monomer containing a specific amount of unsaturated carboxylic acid (Japanese Unexamined Patent Publication (Kokai) No. 222324/1993); a coating composition comprising as a main component an aqueous dispersion of pendant acetoacetyl group-containing synthetic resin (Japanese Unexamined Patent Publication No. 148432/1993); a mixture of substantially water-insoluble mono- or poly-basic salts of a specific keto-acid and a cation or a base selected from amines, guanidines and amidines (Japanese Unexamined Patent Publication No. 70715/1993); and a copolymer resin prepared by copolymerization of an unsaturated carboxylic acid, a glycidyl group-containing unsaturated monomer and an alkyl ester of acrylic acid (Japanese Unexamined Patent Publication No. 192166/1991); etc.

Each of the above-proposed methods comprising coating metals with the specific resins necessitates the formation of considerably thick films to assure corrosion resistance. Generally the coating films of said coating materials have low adhesion to metals such as iron sheets, plated steel sheets and the like. Particularly in wet circumstances, the films have drastically reduced adhesion and become removed from metals. None of said coating films maintain good adhesion to metals under wet conditions.

SUMMARY OF THE INVENTION

The first object of the present invention is to provide a chromium-free surface-treating composition which is free of the foregoing prior art drawbacks and which exhibits excellent adhesion and assures extremely excellent corrosion resistance and overcoat adhesion, even when formed into a thin film on the surface of cold-rolled steel sheets, Zn— or Zn alloy-plated steel sheets, sheets of Ni, Cu, Pb, Sn, Cd, Al, Ti or the like, steel sheets plated with these metals or with alloys of these metals, etc.

Herein, the term "overcoat adhesion" refers to the adhesion or bond strength between (i) the film formed from the surface-treating composition and optionally having an organic resin film thereon and (ii) the film formed on said film (i) from a commonly used coating composition such as melamine-containing low temperature baking coating composition.

The second object of the invention is to provide a chromium-free surface-treated metal sheet excellent in post-processing bare corrosion-resistance and overcoat adhesion, obtainable by forming, in a specific coating weight, a film excellent in post-processing bare corrosion-resistance and overcoat adhesion with use of the above surface-treating composition on the surface of cold-rolled steel sheets, Zn— or Zn alloy-plated steel sheets, sheets of Ni, Cu, Pb, Sn, Cd, Al, Ti or the like, steel sheets plated with these metals or with alloys of these metals, etc.

Herein, the term "post-processing bare corrosion-resistance" refers to the corrosion resistance of the surface-treated metal sheets after some processing such as bending, drawing and the like.

The third object of the invention is to provide a chromium-free surface-treated metal sheet excellent in post-processing bare corrosion-resistance and overcoat adhesion, obtainable by forming, in a specific coating weight, a first coating film excellent in overcoat with use of the above surface-treating composition on the surface of cold-rolled steel sheets, Zn— or Zn alloy-plated steel sheets, sheets of Ni, Cu, Pb, Sn, Cd, Al, Ti or the like, steel sheets plated with these metals or with alloys of these metals, etc., and then coating said first coating film with a specific coating weight of an organic resin film.

The fourth object of the invention is to provide a chromium-free surface-treated metal sheet excellent in post-processing bare corrosion-resistance and overcoat adhesion, obtainable by forming, in a specific coating weight, a first film excellent in scratch resistance and overcoat adhesion with use of the above surface-treating composition on the surface of cold-rolled steel sheets, Zn— or Zn alloy-plated steel sheets, sheets of Ni, Cu, Pb, Sn, Cd, Al, Ti or the like, steel sheets plated with these metals or with alloys of these metals, etc., and then coating said first coating film with a specific coating weight of a second coating film of a coating composition comprising an organic resin and a colloid (sol) or powder of $SiO_2$, $SnO_2$, $Fe_2O_3$, $Fe_3O_4$, $MgO$, $ZrO_2$, $Al_2O_3$ and $Sb_2O_5$.

The present invention provides:
(1) a chromium-free composition for treating the surface of metals, the composition comprising:
   (a) a hydroxyl group-containing organic resin,
   (b) a phosphoric acid, and
   (c) at least one of ions and/or compounds of at least one metal selected from the group consisting of Cu, Co, Fe, Mn, Sn, V, Mg, Ba, Al, Ca, Sr, Nb, Y and Zn (hereinafter referred to as "first invention").

The composition, when applied to a Zn-plated steel sheet and dried, forms a coating film which has an ability to remain unremoved from the Zn-plated steel sheet even after the Zn-plated steel sheet having the coating film thereon is immersed in boiling water for 30 minutes.

The present invention further provides:
(2) a chromium-free composition for treating the surface of metals, which comprises the chromium-free surface-treating composition of the first invention and at least one of colloids (sols) or powders of $SiO_2$, $Fe_2O_3$, $Fe_3O_4$, $MgO$, $ZrO_2$, $SnO_2$, $Al_2O_3$ and $Sb_2O_5$ (hereinafter referred to as "second invention").

The present invention also provides (3) a surface-treated metal sheet comprising
   (i) a member selected from the group consisting of a metal sheet, a metal-plated steel sheet and a metal alloy-plated steel sheet, and
   (ii) a coating film formed on the surface of said member by applying the surface-treating composition of the first invention to the surface of said member, followed by drying, wherein said coating film has a coating weight of 0.1 to 3.0 g/m² on dry basis (hereinafter referred to as "third invention"); and (4) a surface-treated metal sheet comprising
   (i) a member selected from the group consisting of a metal sheet, a metal-plated steel sheet and a metal alloy-plated steel sheet, and
   (ii) a coating film formed on the surface of said member by applying the surface-treating composition of the second invention to the surface of said member, followed by drying, wherein the coating film has a coating weight of 0.1 to 3.0 g/m² on dry basis (hereinafter referred to as "fourth invention").

The present invention further provides (5) a surface-treated metal sheet obtained by coating the surface-treated metal sheet of the third or fourth invention with a coating film of an organic resin (hereinafter referred to as "fifth invention"). More specifically, the fifth invention provides a surface-treated metal sheet comprising
   (i) a member selected from the group consisting of a metal sheet, a metal-plated steel sheet and a metal alloy-plated steel sheet,
   (ii) a corrosion-resistant coating film formed on the surface of said member, and
   (iii) a coating film of an organic resin formed on the corrosion-resistant coating film (ii),
   wherein the corrosion-resistant coating film (ii) is formed by applying the surface-treating composition of the first or second invention to the surface of said member (i), and
   wherein the organic resin is at least one resin selected from the group consisting of an organic resin prepared by copolymerization of at least two members selected from the group consisting of methyl methacrylate, butyl acrylate, styrene, glycidyl methacrylate, methacrylic acid, acrylic acid, organic phosphorus monomer and hydroxyethyl acrylate; olefin/acrylic acid copolymer resins; polyacrylic acid and copolymer resins thereof; polymethacrylic acid esters and copolymer resins thereof; polyacrylic acid esters and copolymer resins thereof; epoxy resin; acryl-modified epoxy resins; ester-modified epoxy resins; urethane-modified epoxy resins; urethane-modified epoxy ester resins; vinyl-modified epoxy resins and vinyl-modified epoxy ester resins, and
   wherein the coating film of the organic resin (iii) has a coating weight of 0.2 to 3.0 g/m² on dry basis.

The present invention further provides (6) a surface-treated metal sheet obtained by coating the surface-treated metal sheet of the third or fourth invention with a coating film of a coating composition comprising an organic resin and a colloid (sol) or a powder (hereinafter referred to as "sixth invention"). Stated more specifically, the sixth invention provides a surface-treated metal sheet comprising
   (i) a member selected from the group consisting of a metal sheet, a metal-plated steel sheet and a metal alloy-plated steel sheet,
   (ii) a corrosion-resistant coating film formed on the surface of said member, and
   (iii) a coating film of a coating composition comprising an organic resin and a colloid (sol) or a powder and formed on the corrosion-resistant coating film (ii),
   wherein the corrosion-resistant coating film (ii) is formed by applying the surface-treating composition of the first or second invention to the surface of said member, and
   wherein the organic resin contained in the coating composition for forming the coating film (iii) is at least one resin selected from the group consisting of an organic resin prepared by copolymerization of at least two members selected from the group consisting of methyl methacrylate, butyl acrylate, styrene, glycidyl methacrylate, methacrylic acid, acrylic acid, organic phosphorus monomer and hydroxyethyl acrylate; olefin/acrylic acid copolymer resins; polyacrylic acid and copolymer resins thereof; polyacrylic acid esters and copolymer resins thereof; polymethacrylic acid esters and copolymer resins thereof; epoxy resins; acryl-modified epoxy resins; ester-modified epoxy resins; urethane-modified epoxy resins; urethane-modified epoxy ester resins; vinyl-modified epoxy resins and vinyl-modified epoxy ester resins, and
   wherein the colloid (sol) or the power contained in coating film (iii) is used in an amount of 10 to 60 parts by weight, per 100 parts by weight of the organic resin, and is selected from colloids (sols) or powders of $SiO_2$, $Fe_2O_3$, $Fe_3O_4$, $MgO$, $ZrO_2$, $SnO_2$, $Al_2O_3$ and $Sb_2O_5$, and
   wherein the coating film of the coating composition has a coating weight of 0.2 to 3.0 g/m² on dry basis.

This invention also provides a surface-treated metal article comprising
   (i) a metal substrate,
   (ii) a corrosion-resistant coating film formed on said metal substrate,
   wherein the corrosion-resistant coating film (ii) is formed by applying the surface-treating composition of the surface-treating composition of first or second invention to the metal substrate (i), followed by drying.

This invention further provides a surface-treated metal article comprising
   (i) a metal substrate,
   (ii) a corrosion-resistant coating film formed on said metal substrate, and
   (iii) a coating film of a coating composition which comprises an organic resin and if desired a colloid (sol) or a powder and which is formed on the corrosion-resistant coating film (ii),
   wherein the corrosion-resistant coating film (ii) is formed by applying the surface-treating composition of the surface-treating composition of the first or second invention to the metal substrate (i), followed by drying,
   wherein the organic resin contained in the coating composition for forming the coating film (iii) is at least one resin selected from the group consisting of an organic resin prepared by copolymerization of at least two members selected from the group consisting of methyl methacrylate, butyl acrylate, styrene, glycidyl methacrylate, methacrylic acid, acrylic acid, organic phosphorus monomer and hydroxyethyl acrylate; olefin/acrylic acid copolymer resins; polyacrylic acid and copolymer resins thereof; polyacrylic acid ester and copolymer resins thereof; polymethacrylic acid ester and copolymer resins thereof; epoxy resin; acryl-modified epoxy resin; ester-modified epoxy resin; urethane-modified epoxy resin; urethane-modified epoxy ester resin; vinyl-modified epoxy resin and vinyl-modified epoxy ester resin, and wherein the colloid (sol) or the powder, if contained in the coating composition for forming the coating film (iii), is used in an amount of 10 to 60 parts by weight, per 100 parts by weight of by weight of the organic resin, and is selected from colloids (sols) or powders of $SiO_2$, $Fe_2O_3$, $Fe_3O_4$, MgO, $ZrO_2$, $SnO_2$, $Al_2O_3$ and $Sb_2O_5$, and wherein the coating film (iii) of the coating composition has a coating weight of 0.2 to 3.0 $g/m^2$ on dry basis.

When applied to metals such as cold-rolled steel sheets, Zn— or Zn alloy-plated steel sheets and the like, the surface-treating composition of the invention comprising (a) a specific hydroxyl group-containing organic resin, (b) a phosphoric acid, and (c) at least one of ions and compounds of at least one specific heavy metal gives a coating film which assures a high adhesion to the metal substrates and which shows excellent post-processing bare corrosion resistance and excellent overcoat adhesion.

DETAILED DESCRIPTION OF THE INVENTION

Composition for Treating the Surface of Metals (First Invention)

Described below are (a) a specific hydroxyl group-containing organic resin, (b) a phosphoric acid, and (c) ion or a compound of heavy metal and the properties of the coating film.

The percentages and parts in the following description are all by weight.

The term "(meth)acrylic acid" used in the specification and the appended claims refers to methacrylic acid and/or acrylic acid, and the term "(meth)acrylate" used herein means methacrylate and/or acrylate.

(a) Hydroxyl Group-containing Organic Resin

In the present invention, the term "hydroxyl group" used in connection with the hydroxyl group-containing organic resin is intended to mean usual hydroxyl group (—OH), and also to include other groups such as glycidyl group, an aldehyde (—CHO) group and amino (—$NH_2$) group, which can produce substantially the same effect (in respect of adhesion, corrosion resistance, etc.) as usual hydroxyl group (—OH), when the hydroxyl group-containing resin contains such other group(s) in addition to —OH group(s).

The hydroxyl group-containing resin to be used in the invention contains hydroxyl group(s) (—OH alone or total of —OH and said other group(s) such as glycidyl group, aldehyde group or amino group) preferably in an amount of at least 0.04 equivalent per 100 g of the hydroxyl group-containing resin (0.04 equivalent/100 g). More preferably, the hydroxyl group-containing resin contains said hydroxy group(s) in an amount of 0.04 to 2 equivalents, most preferably 0.04 to 1.0 equivalent, per 100 g of the hydroxyl group-containing resin.

The hydroxyl group-containing resins useful in the invention can be any of conventional resins containing the above-mentioned hydroxyl group(s), such as acrylic resins prepared by polymerization of an acrylic monomer having said hydroxyl group(s), epoxy resins, phenoxy resins, phenol (formaldehyde) resins (form aldehyde condensates of an alkylated phenol and/or cresol, polyester resins, polyurethane resins, cellulose resins and the like. These resins are described below.

<Acrylic Resins>

The term "acrylic resins" used herein refers to all of polymers of unsaturated compounds and include vinyl resins in addition to conventional acrylic resins.

Acrylic resins which can be used in the invention are those prepared by polymerization of a monomer or monomers having said hydroxyl group or groups (namely —OH and optionally said other group(s)). Specific examples of such monomers are 2-hydroxyethyl(meth)acrylate, 2-hydroxypropyl(meth)acrylate, 4-hydroxybutyl(meth)acrylate, glycerol mono(meth)acrylate, allyl alcohol, glycerin monoallyl ether, vinyl phenol, N-methylol(meth)acrylamide, N-butoxymethylol(meth)acrylamide, glycidyl (meth)acrylate, allyl glycidyl ether, β-methylglycidyl(meth)acrylate, 3,4-epoxy cyclohexyl(meth)acrylate, acrolein, etc. Useful monomers also include vinyl esters such as vinyl acetate which can give hydroxyl groups by hydrolysis after polymerization.

Useful other copolymeriable components include, for example, conventional unsaturated compounds, such as (meth)acrylic acid and alkali metal salts, ammonium salts or organic amine salts thereof, methyl(meth)acrylate, ethyl (meth)acrylate, butyl(meth)acrylate, n-hexyl(meth)acrylate, lauryl(meth)acrylate, phenoxyethyl(meth)acrylate, benzyl (meth)acrylate, cyclohexyl(meth)acrylate, dimethylaminoethyl(meth)acrylate, acid phosphoxyethyl (meth)acrylate (e.g., trademark "Phosmer M", product of Uni Chemical Co., Ltd.) and like esters of (meth)acrylic acids, maleic acid, maleic anhydride, mono- or di-$C_1$–$C_{12}$ alkyl esters of maleic acid, fumaric acid, mono- or di-$C_1$–$C_{12}$ alkyl esters of fumaric acid, itaconic acid, itaconic anhydride, mono- or di-$C_1$–$C_{12}$ esters of itaconic acid, citraconic acid, $C_1$–$C_{12}$ esters of citraconic acid, (meth) acrylamides, diacetone(meth)acrylamide, dimethylisopropyl (meth)acrylamide, dimethyl(meth)acrylamide, (meth) acrylamide methylpropanesulfonic acid and like (meth) acrylamides, vinyl isobutyl ether and like vinyl ethers, styrene, α-methylstyrene, vinyl toluene, t-butylstyrene, p-nitrostyrene, sodium styrene sulfonate, chloromethylstyrene, N-vinylpyrrolidone, N-vinylcarbazole and like vinyl compounds, (meth)acrylonitrile, etc. These compounds can be used either alone or in combination. Bifunctional or higher multi-functional monomers such as ethylene glycol di(meth)acrylate, propylene glycol di(meth) acrylate, diethylene glycol di(meth)acrylate, trimethylolpropane tri(meth)acrylate and the like can be optionally used.

These monomers can be polymerized by conventional polymerization methods, such as solution polymerization, emulsion polymerization, suspension polymerization, bulk polymerization, dispersion polymerization, etc. Examples of useful reaction solvents include conventional solvents such as aromatic hydrocarbons, ketones, esters, ethers (cyclic ethers, glycol ethers, etc.), N-substituted amides, alcohols, carboxylic acids, amines and like organic solvents, water and mixtures of at least two of them, and so on. In suspension polymerization or emulsion polymerization, additives such as known surfactants, buffering agents and the like may be used, but should preferably be used in a minimum amount, because these additives tend to decrease the adhesion. The polymerization is initiated by a method suited to each polymerization method, e.g. using conventional azo compounds, peroxides, persulfate compounds, redox initiators and like polymerization initiators. The polymerization can be conducted using active energy radiation such as ultraviolet rays or electron beam. The amount of the polymerization initiator to be used is at least 0.1% by weight based on the monomer. Conventional additives including chain transfer agents such as octylmercaptan, dodecylmercaptan, mercaptoethanol, α-methylstyrene dimers, and the like can also be used. A preferred amount of the additive to be used is in the range which does not impair the properties of the resulting polymers.

<Epoxy Resins>

Epoxy resins to be used in the invention include, for example, epoxy resins prepared from dihydric alcohols, phenols, halogenation products or hydrogenation products of phenols, novolaks (reaction products of polyhydric phenol with formaldehyde or like aldehydes in the presence of an acidic catalyst); acid-modified products of these epoxy resins such as aliphatic acid- or phosphoric acid-modified products thereof and mixtures thereof. These epoxy resins may be used alone or in combination. Among them, it is suitable to use bisphenol A-type epoxy resins, hydrogenated bisphenol A-type epoxy resins, bisphenol F-type epoxy resins, modified products thereof, etc.

<Phenoxy Resins>

Phenoxy resins which can be used in the invention include those prepared by conversion of the above epoxy resins into higher molecular weight epoxy resins. Various phenoxy resins can be used in the invention.

<Phenol Resins>

Examples of useful phenol resins are formaldehyde condensates of phenols, alkylated phenols and cresols. More specific examples are formaldehyde condensates of alkylated (methyl, ethyl, propyl, isopropyl, butyl) phenols, p-tert-amyl phenol, 4,4'-sec-butylidene phenol, p-tert-butyl phenol, o-, m- or p-cresol, p-cyclohexyl phenol, 4,4'-isopropylidene phenol, p-nonyl phenol, p-octyl phenol, 3-pentadecyl phenol, phenol, phenyl-o-cresol, p-phenyl phenol, xylenol, and the like.

<Polyester Resins>

Polyester resins which can be used in the invention include conventional polyester resins such as polycondensates of dicarboxylic acids and glycols, polymers obtained by ring opening polymerization of lactone compounds, polymers prepared from dicarboxylic acids and epoxy compounds, etc. Polyester resins having good hydrolysis-resistance are preferred in view of stability in the metal surface-treating composition.

These polyester resins are prepared by conventional methods, as by polycondensation reaction of the reactants in the molten state in the presence of a catalyst.

With respect to these resins, hydroxyl groups are introduced only at the terminals of the molecules, and therefore it is preferable that the required amount of hydroxyl groups be provided by limiting the weight average molecular weight of the polyester resins to 5,000 or less, or by introducing a branched structure using a tri- or more functional compound to increase the number of the terminals per molecule. When a higher molecular weight polyester is used, it would be difficult to afford sufficient hydroxyl groups only by means of the terminal groups of the molecules, and therefore the deficiency of hydroxyl groups can be made up for by modifying such high molecular weight polyester with a resin having a sufficient amount of hydroxyl groups, as will be described later.

<Polyurethane Resins>

Polyurethane resins which can be used in the invention are prepared from a polyol, an organic diisocyanate compound and if desired a chain-extending agent having one or more active hydrogen groups.

The polyols useful in the present invention are various polyols, and include, for example, polyester polyols, polyether polyols, polycarbonate polyols, polyolefin polyols, and additionally include the above-mentioned epoxy resins, phenoxy resins, cellulose resins, phenol resins, and the like. These polyols can be used either alone or in combination. As the organic diisocyanate compound, various diisocyanate compounds such as isophorone diisocyanate are used. As the chain-extending agent, there may be mentioned glycols such as propylene glycol, neopentyl glycol, 2,2-diethyl-1,3-propanediol, diethylene glycol, spiro glycol, polyethylene glycol, diamines such as ethylenediamine, hexamethylenediamine, propylenediamine, and the like.

With respect to these resins, hydroxyl groups are introduced only at the terminals of the molecules, and therefore it is preferable that the required amount of hydroxyl groups be provided by limiting the weight average molecular weight of the polyester resins to 5,000 or less, or by introducing a branched structure using a tri- or more functional compound to increase the number of the terminals per molecule. When a higher molecular weight polyurethane is used, it would be difficult to afford sufficient hydroxyl groups only by means of the terminal groups of the molecules, and therefore the deficiency of hydroxyl groups can be made up for by modifying such high molecular weight polyurethane resin with a resin having a sufficient amount of hydroxyl groups, as will be described later.

<Other Hydroxyl Group-containing Resins>

Other hydroxyl group-containing resins to be used in the invention include cellulose resins such as substituted cellulose resins, butyral resins, etc.

The hydroxyl group-containing resin to be used in the present invention include one of the above-mentioned resins or a combination of at least two of them, and additionally include a product formed by modifying other resins containing hydroxyl group(s) in an amount of less than 0.04 equivalent/100 g with the above-mentioned hydroxyl group-containing resin in such a manner that the resulting product will have a hydroxyl group content of at least 0.04 equivalent/100 g. Examples of such resins having a hydroxyl group content of less than 0.04 equivalent/100 g (hereinafter referred to as "modifiable resins") are acrylic resins less than 0.04 equivalent/100 g in hydroxyl group content, higher molecular weight polyester resins, higher molecular weight polyurethane resins, polyamide resins, polycarbonate resins, polyolefin resins, chlorinated polyolefin resins, fluorinated polyolefin resins, polyisoprenes, polyether resins, xylene (formaldehyde) resins, maleimide resins, silicone resins, ketone resins, etc.

The modifiable resin can be modified by the following methods to which, however, the modification is not limited.

1. One or more functional groups such as carboxyl group, hydroxyl group and amino group is/are introduced into a modifiable resin, and the introduced functional group(s) is/are reacted with one or more terminal epoxy groups of the epoxy resin which is one of the hydroxyl group-containing resins.

2. One or more functional groups such as hydroxyl group, amino group and the like is/are introduced into a modifiable resin, and the hydroxyl group-containing resin is reacted therewith by means of a diisocyanate compound.

3. A monomer mixture containing a hydroxyl group containing monomer is polymerized in the presence of a modifiable resin to accomplish modification such as graftpolymerization, block polymerization or the like. If necessary, resin having no hydroxyl groups or less than 0.04 equivalent/100 g of hydroxyl group may be blended.

<Crosslinking Agent>

Various crosslinking agents can also be used in the invention and include phenol resins such as formaldehyde condensates of alkylated phenols and cresols; amino resins such as addition product of melamine and formaldehyde, as well as alkyl ether compounds of these and alcohols having 1 to 6 carbon atoms; and epoxy compounds such as diglycidyl ethers of various compounds and oligomers thereof; polyisocyanate compounds and blocked polyisocyanate compounds.

<Form of Hydroxyl Group-containing Organic Resins>

The hydroxyl group-containing organic resins to be used in the invention can be any of organic solvent-soluble, water-soluble and water-dispersible organic resins. When a solvent-soluble resin is used, conventionally used solvents can be used. When a water-dispersible or water-soluble resin is used to form a metal surface-treating composition in the form of an aqueous dispersion or solution, sufficient stability should be imparted to the composition to avoid precipitation or coagulation which is likely to occur due to the phosphoric acid used. To assure such stability, it is desirable to introduce a small amount of one or more functional groups such as phosphoric acid group, sulfonic acid group or sulfuric acid group into such water-dispersible or water-soluble hydroxyl group-containing organic resin.

(b) Phosphoric Acid

Phosphoric acids which can be used in the invention can be any of those which form or release phosphoric acid in the surface-treating composition of the present invention. Useful phosphoric acids include, for example, orthophosphoric acid and phosphoric acid compounds such as polyphosphoric acid, hypophosphorous acid, tripolyphosphoric acid, hexametaphosphoric acid, monobasic phosphoric acid, dibasic phosphoric acid, tribasic phosphoric acid, polymetaphosphoric acid, biphosphoric acid, etc. Among them, orthophosphoric acid is particularly preferred.

The phosphoric acid is used in an amount of about 2 to about 60 parts by weight, preferably about 2 to about 50 parts by weight, per 100 parts by weight of hydroxyl group-containing resin (a). The use of less than 2 parts by weight and more than 60 parts by weight tends to reduce the adhesion of the resulting corrosion-resistant film to a metal sheet. The use of more than 60 parts by weight also tends to lower the overcoat adhesion.

(c) Ions or Compounds of Heavy Metal

According to the invention, heavy metal component (c) is at least one of ions or compounds of metals selected from the group consisting of Cu, Co, Fe, Mn, Sn, V, Mg, Ba, Al, Ca, Sr, Nb, Y and Zn.

The heavy metal components are capable of supplying ions in the surface-treating composition of the invention which always contains water. These metals can be in any form, including salts of inorganic acid or organic acid such as phosphoric acid, hydrochloric acid, sulfuric acid, nitric acid, acetic acid and the like, hydroxides, oxides, powders, etc., so far as they form or release metal ions in the surface-treating composition of the invention.

Among them, phosphates of the above metals are particularly preferred.

The compounds capable of supplying these metal ions are known and easily available, or can be easily prepared by conventional processes. For example, the phosphates of said metals are all known.

At least one of ions or compounds of these heavy metals is used in a proportion of 0.015 to 1.5 gram ions or gram molecules, preferably 0.05 to 1.0 gram ion or gram molecule, per 100 g of the hydroxyl group-containing organic resin (a).

The reason why the surface-treating composition of the invention gives a film which exhibits a high adhesion to the metal sheets and excellent corrosion resistance in spite of being chromium-free remains to be fully clarified. The reason for giving rise to these properties can presumably be explained, taking magnesium ion as an example, as follows.

When an aqueous solution containing a hydroxyl group-containing organic resin and Mg ions is applied to a metal sheet and dried to form a coating film, $Mg^{++}$ presumably oxidizes the OH groups of the hydroxyl group-containing resin while accomplishing crosslinking between the resin molecules, thereby leading to the formation of dense coating film.

It is presumed that due to the dense coating film thus formed, the bond between the substrate (metal sheet) and the coating film is strengthened and a higher corrosion resistance is assured.

It is also presumed that a high overcoat adhesion is assured owing to the synergistic effect of phosphoric acid and the remaining OH groups which have not been oxidized by $Mg^{++}$.

While $Mg_3(PO_4)_2 nH_2O$ is formed due to the coexistence of $Mg^{++}$ and phosphoric acid, it would be possible that Mg is partly substituted by Zn in the case of Zn-plated steel sheet to give $Mg_2Zn(PO_4)_2 nH_2O$ with the result that the adhesion of the coating film to the substrate is strengthened.

When ions of Cu, Co, Mn, Sn, V, Al, Ba, Ca, Sr, Fe, Nb, Y and Zn coexist with the hydroxyl group-containing resin, they exhibit the same function as $Mg^{++}$. Among these metals ions, preferred are $Al^{+++}$, $Ba^{++}$, $Ca^{++}$, $Sr^{++}$, $Fe^{++}$, $Nb^{+++}$, $Nb^{+++++}$, $Y^{+++}$, $Zn^{++}$, $Mn^{++}$, $Cu^{++}$, $Co^{++}$, $Sn^{++}$ and $V^{++}$.

It is preferable that the metal ions are supplied in the form of a phosphoric acid compound.

For example, in the case of Mn, manganese (II)(ortho) phosphate($Mn_3(PO_4)_2$ $nH_2O$), manganese(III)(ortho) phosphate($MnPO_4$ $nH_2O$), ammonium manganese phosphate (($NH_4$)$MnPO_4$ $nH_2O$), manganese(II)pyrophosphate ($Mn_2P_2O_7$ $nH_2O$), manganese(III)pyrophosphate($Mn_4$ $(P_2O_7)_3$ $nH_2O$), manganese(II)monohydrogen(ortho) phosphate($MnHPO_4$ $nH_2O$), manganese(II)dihydrogen (ortho)phosphate ($H_4[Mn(PO_4)_2]$ $nH_2O$) and manganese (III)hydrogen(ortho)phosphate($MnH_3(PO_4)_2$ $nH_2O$) are used effectively. In the case of Mg, magnesium phosphate ($Mg_3(PO_4)_2$ $nH_2O$), ammonium magnesium phosphate(Mg ($NH_4$)$PO_4$ $nH_2O$), magnesium hydrogen phosphate ($MgHPO_4$ $nH_2O$), magnesium dihydrogen phosphate(Mg ($H_2PO_4$)$_2$ $nH_2O$) and magnesium pyrophosphate($Mg_2P_2O_7$ $nH_2O$) are used effectively. In the case of Ca, calcium phosphate($Ca_3(PO_4)_2$ $nH_2O$), ammonium calcium phosphate ($NH_4CaPO_4$ $nH_2O$), calcium dihydrogenphosphate ($Ca(H_2PO_4)_2$ $nH_2O$), calcium secondary phosphate ($CaHPO_4$) and calcium pyrophosphate($Ca_2P_2O_7$ $nH_2O$) are used effectively. In the case of Cu, Co, Fe, Sn, V, Ba, Al, Sr, Nb, Y and Zn, the same type's phosphoric acid compounds are used effectively, too.

Generally speaking, the strength of the coordination to the anion is lower in the order of $PO_4^{3-} < NO_3^- < Cl^- < SO_4^{--} < CH_3COO^-$(highest). In the case of Mn, when $NO_3^-$, $Cl^-$, $SO_4^{--}$ or $CH_3COO^-$ ions are coordinated, these ions more firmly coordinate than $PO_4^{3-}$ so that due to the hindrance by the coordinated ions, it tends to become difficult for $Mn^{++}$ to oxidize the OH group. In other words, if manganese chloride, manganese sulfate, manganese nitrate or manganese acetate is added, the function of $Mn^{++}$ as a crosslinking agent tends to be reduced.

On the other hand, in the case of manganese phosphate, $P_4^{3-}$ is weakly coordinated to $Mn^{++}$ so that $Mn^{++}$ effectively oxidizes the OH group, namely can effectively achieve the function of a crosslinking agent.

$PO_4^{3-}$ weakly coordinated to $Mn^{++}$ is presumably given a catalytic activity of promoting the oxidation of OH group by $Mn^{++}$. A phosphoric acid to be added is presumably required for accomplishing proper coordination of $PO_4^{3-}$.

The chromium-free surface-treating composition of the present invention is prepared by dissolving or suspending in water or a mixture of water and a organic solvent the specific hydroxyl group-containing organic resin (a), the phosphoric acid (b), and the ions or compound of the heavy metals (c) in the above specified respective amounts.

The obtained surface-treating composition is adjusted to a solids content of about 5 to about 50% by weight, preferably about 7 to about 30% by weight. When the solids content is less than 5% by weight, it is difficult to form a coating film. When the solids content is more than 50% by weight, there is a tendency that gelation is accelerated, making it difficult to form a stable and dense coating film.

(d) Addition of Colloid (Sol) or Powder (Second Invention)

According to the present invention, adhesion to a metal sheet and corrosion resistance can be improved by the addition of at least one of specific colloids (sols) or powders to the above-mentioned surface-treating composition.

Useful colloids (sols) and powders are, for example, colloidal silica, powders of $SiO_2$, and colloids (sols) or powders of $SnO_2$, $Fe_2O_3$, $Fe_3O_4$, MgO, $Al_2O_3$ or $ZrO_2$. At least two of them can be used in combination.

The particle size of the colloids (sols) or powders is preferably in the range of about 1 to about 30 nm, more preferably about 1 to about 15 nm, and most preferably about 1 to about 12 nm. A particle size of more than 30 nm tends to lower the overcoat adhesion, and a particle size of less than 1 nm or more than 12 mn is apt to reduce the corrosion resistance of processed parts or scratch resistance thereof.

At least one of colloids (sols) or powders of $SiO_2$, $Fe_2O_3$, $Fe_3O_4$, MgO, $ZrO_2$, $SnO_2$, $Al_2O_3$ and $Sb_2O_5$ is preferably used in an amount of about 3 to about 300 parts by weight, more preferably about 3 to about 30 parts by weight, per 100 parts by weight of the hydroxyl group-containing organic resin (a). The amount of more than 300 parts by weight tends to decrease the overcoat adhesion.

Among the colloids (sols), colloidal silica is preferable because it is solidified by reaction with heavy metal ions and contributes to the formation of tough coating film, in conjunction with the hydroxyl group-containing organic resin, resulting in excellent corrosion resistance of processed parts.

The surface-treating composition containing the colloid (sol) or powder is adjusted to a solids content of about 5 to about 50% by weight, preferably about 7 to about 30% by weight. When the solids content is less than 5% by weight, it is difficult to form a coating film, whereas when a solids content is more than 50% by weight, there is a tendency that gelation is accelerated, making difficult to form a stable and dense coating film.

Surface-treated Metal Sheet (Third and Fourth Inventions)

The surface-treating composition according to the first or second invention is applied to a metal sheet to be treated and dried by conventional methods to give a corrosion-resistant coating film.

The composition thus applied is dried, for example, by heating at a temperature of about 60 to about 320° C., preferably about 80 to about 300° C.

The surface-treating composition of the invention may be applied to metals by any of coating methods such as roll coating, spray coating, brushing, dipping, curtain flow coating, etc.

Metal sheets to be treated with the surface-treating compositions of the invention are not specifically limited, irrespective of the kind of metal, and include cold-rolled steel sheets, plated steel sheets such as Zn-electroplated steel sheets hot-dip Zn-coated steel sheets, Zn—Ni, Zn—Ni—Co, Zn—Ni—Cr, Zn—Fe, Zn—Co, Zn—Cr, Zn—Mn, Zn—Al, Zn—Al or Zn—Mg alloy-electroplated or hot-dip coated steel sheets, hot rolled skin steel sheets, hot rolled pickling steel sheets, stainless steel sheets, silicon steel sheets, etc. Also usable are strips or sheets of metals such as Ni, Cu, Pb, Cd, Sn, Al, Ti, Zn, Co, Cr, Mg, Mn or the like, steel sheets plated with these metals or with alloys of these metals, etc. Among them, Zn-plated or Zn-containing metal sheets are most effectively surface-treated.

In addition, the surface-treating composition according to the present invention can be applied to any metal articles such as plates, wire rods, sections, pipes and the like, only if coating film can be formed thereon. Thus, there is no specific restriction on the shape of the metal articles.

It is sufficient that the coating film of the surface-treating composition of the invention has a coating weight of at least 0.1 g/m$^2$, calculated as dry weight, and the coating weight is preferably up to 3.0 g/m$^2$, calculated as dry weight, from the viewpoint of economy, irrespective of whether or not it contains a colloid or powder.

Organic Composite Coated Steel Sheet

The surface-treating composition according to the invention is applied to metal articles such as cold-rolled steel sheets, Zn— or Zn alloy-plated steel sheets, sheets of Ni, Cu, Pb, Sn, Cd, Al, Ti or the like, steel sheets plated with these metals or with alloys of these metals, etc., whereby a coating film excellent in adhesion to the substrates (metal sheets), overcoat adhesion and post-processing bare corrosion resistance can be formed. The obtained coating film of the surface-treating composition of the invention has a high adhesion to other organic resin coating films. Thus an organic composite coated steel sheet, as well as organic composite coated metal articles, can be produced by applying one or more organic resins to the coating film of the surface-treating composition.

Organic resins to be applied to the coating film of the surface-treating composition can be selected from a wide range of resins including the above-mentioned hydroxyl group-containing organic resins and resins conventionally used in the field of treating the surface of metals.

Any film forming resins can be used, irrespective of the initial molecular weight thereof, insofar as the resin is capable of forming a tough coating film by crosslinking or by reaction.

Examples of useful resins are an organic resin prepared by copolymerization of at least two members selected from the group consisting of methyl methacrylate, butyl acrylate, styrene, glycidyl methacrylate, methacrylic acid, acrylic acid, organic phosphorus monomer and hydroxyethyl acrylate; olefin/acrylic acid copolymer resins; polyacrylic acid and copolymer resins thereof; polyacrylic acid ester and copolymer resins thereof; polymethacrylic acid ester and copolymer resins thereof; epoxy resin; acryl-modified epoxy resin; ester-modified epoxy resin; urethane-modified epoxy resin; urethane-modified epoxy ester resin; vinyl-modified epoxy resin and vinyl-modified epoxy ester resin.

These organic resins may be used in mixture with at least one of said colloids (sol) or powders of $SiO_2$, $SnO_2$, $Fe_2O_3$, $Fe_3O_4$, MgO, $ZrO_2$, $Al_2O_3$ and $Sb_2O_5$. Said at least one of the colloids (sols) or powders is used preferably in an amount of 10 to 60 parts by weight, more preferably 10 to 40 parts by weight, per 100 parts by weight of the organic resin, because the use of said colloids (sols) or powders in an amount of less than 10 parts by weight or more than 60 parts by weight does not appreciably improve the corrosion resistance.

Higher effects can be produced when the colloid (sol) or powder have a particle size of about 2 to about 15 nm.

When a coating film of the organic resin or organic resin containing said colloid or powder is formed on the coating film of the surface-treating composition of the present invention, said organic resin or organic resin containing the colloid or powder is uniformly dispersed in water to give an aqueous dispersion. The dispersion is applied to the coating film of the surface-treating composition and dried by conventional methods.

The solids content of the aqueous dispersion are not specifically limited insofar as a uniform coating film can be formed. Generally, it is recommended that the solids content thereof is about 5 to about 50% by weight, preferably about 10 to about 40% by weight.

The aqueous dispersion can be applied in the same method as described with respect to the application of the surface-treating composition of the present invention. After application, the composition is dried by heating to a temperature of about 60 to about 320° C. preferably about 80 to about 300° C.

The organic resin or a mixture of the organic resin and the inorganic substances (colloid or powder) as exemplified above is applied to the coating film of the surface-treating composition in an amount of about 0.2 to about 3.0 g/m$^2$, preferably about 0.2 to about 2.0 g/m$^2$ (calculated as dry weight).

A sufficiently improved effect of the coating film may not be obtained in the case of a coating weight of less than 0.2 g/m$^2$, and the weldability would be reduced in the case of a coating weight of more than 3.0 g/m$^2$.

As described above, the surface-treating composition of the present invention is chromium-free and can replace conventional chromate compositions such as coating chromating, resinous chromating, reactive chromating, etc. and is expected to find extensive applications as in container field and in toy field because of the pollution-free and chromium-free characteristics.

EXAMPLES

The present invention is described below in more detail with reference to Examples and Comparative Examples. The performance of the coating films formed therein was evaluated in the following manner.

(1) Adhesion of the coating film

The adhesion between the substrate (metal sheet) and the coating film of the surface-treating composition of the invention was determined as follows. After the coating film formed on the substrate was dried, the coated substrate was immersed in boiling water for 30 minutes. The coating film on the substrate was crosswise cut into squares (2×2 mm) and cellophane tape was applied thereto and peeled off, and the coating-removed area was measured. The adhesion of the coating film was evaluated according to the following criteria (the coating-removed area expressed in percentages):

A: 0%
B: more than 0% to 1%
C: more than 1% to 10%
D: more than 10% to 50%
E: more than 50%

(2) Overcoat Adhesion

The adhesion between an overcoat and the coated substrate was determined as follows. A melamine-containing low-temperature baking coating composition (baking temperature=110° C.) was sprayed on the coating film of the surface-treating composition of the invention formed on the substrate or on the organic composite coated steel sheet (comprising a substrate, a coating film of the surface-treating composition and a coating film of an organic resin optionally containing a colloid (sol) or a powder), thereby forming an overcoat having a thickness of 30 μm after baking. Then, the coated substrate was immersed in boiling water for 30 minutes. The coating was crosswise cut into squares (2×2 mm) and cellophane tape was applied thereto and peeled off, and the coating-removed area was measured. The results were evaluated according to the following criteria (the coating-removed area expressed in percentages):

A: 0%
B: more than 0% to 1%
C: more than 1% to 10%
D: more than 10% to 50%
E: more than 50%

(3) Post-processing Bare Corrosion Resistance

The corrosion resistance of the substrate having thereon a coating film of the surface-treating composition or the corrosion resistance of the organic composite coated steel sheet was determined after cylindrical cup forming as follows. The substrate coated with the surface-treating composition or the organic composite coated steel sheet was pressed to a cylindrical cup of depth of 50 mm. The degree of corrosion resistance was determined based on red rust occurrence on the side of the cylindrical cup which was pressed.

The corrosion test was carried out according to the salt spray test according to JIS-Z-2371 to check the degree of rust occurrence after 100 to 4000 hours of salt water spraying (salt water concentration: 5%, inside temperature: 35° C., spray pressure: 20 psi).

The results were evaluated in the following 5-grade ratings (the degree of red rust area relative to the entire area, expressed in percentages). The grade A means the highest rust resistance.

A: 0%
B: more than 0% to 1%
C: more than 1% to 10%
D: more than 10% to 50%
E: more than 50%

In each of the following examples (Examples I-1 to I-14, II-1 to II-14, III-1 to III-11) and comparative examples (Comparative Examples I-1 to I-5, II-1 to II-6, III-1 to III-3), the aqueous compositions used therein were prepared by adding the components described therein to water such that each of the components had the concentration indicated therein.

In the following examples and comparative examples, the expression "(hydroxyl group=XX equivalent/100 g)" means the amount of —OH group(s) of the resin used, or the total amount of —OH group(s) and at least one of glycidyl, aldehyde and amino groups of the resin when the resin contains at least one of glycidyl, aldehyde and amino groups in addition to —OH group(s).

Example I-1

A Zn-plated steel sheet (coating weight: 20 g/m$^2$) was roll-coated with an aqueous composition containing (a) 60 g/l (grams/liter) of a copolymer resin (hydroxyl group=0.16 equivalent/100 g) of 35 parts of 1-hydroxybutyl acrylate, 20 parts of methyl methacrylate, 30 parts of butyl acrylate, 40 parts of styrene, 20 parts of methacrylic acid, 5 parts of acrylic acid and 1 part of an organic phosphorus monomer (tradename "Phosmer M", product of Uni Chemical Co., Ltd. acid phosphooxyethyl(meth)acrylate); (b) 15 g/l of phosphoric acid; and (c) 0.20 gram molecule/l of copper(II) phosphate; and the resulting wet coating was dried at 130° C. to form a coating film in an amount of 0.30 g/m$^2$.

Example I-2

A Zn—Ni alloy-plated steel sheet (coating weight: 20 g/m$^2$, Ni=11.5%) was roll-coated with an aqueous composition containing (a) 80 g/l of a copolymer resin (hydroxyl group=0.12 equivalent/100 g) of 10 parts of 2-hydroxyethyl acrylate, 30 parts of methyl methacrylate, 50 parts of butyl acrylate, 10 parts of glycidyl methacrylate, 20 parts of methacrylic acid, 10 parts of acrylic acid and 1 part of an organic phosphorus monomer ("Phosmer M"); (b) 20 g/l of phosphoric acid; (c) 0.32 gram molecule/l of cobalt phosphate; and (d) 6 g/l of colloidal silica having a particle size of 1–3 nm; and the resulting wet coating was dried at 135° C. to form a coating film in an amount of 0.40 g/m$^2$.

Example I-3

A Zn—Ni alloy-plated steel sheet (coating weight: 20 g/m$^2$, Ni=12.3%) was roll-coated with an aqueous composition containing (a) 60 g/l of a copolymer resin (hydroxyl group=0.49 equivalent/100 g) of 60 parts of 2,3-dihydroxypropyl methacrylate, 25 parts of methyl methacrylate, 40 parts of butyl acrylate, 25 parts of glycidyl methacrylate, 30 parts of methacrylic acid, 10 parts of acrylic acid and 1 part of an organic phosphorus monomer ("Phosmer M"); (b) 15 g/l of phosphoric acid; and (c) 0.9 gram molecule/l of iron(II) phosphate; and the resulting wet coating was dried at 75° C. to form a coating film in an amount of 0.28 g/m$^2$.

Example I-4

A Zn—Fe alloy-plated steel sheet (coating weight: 20 g/m$^2$, Fe=12.8%) was roll-coated with an aqueous composition containing (a) 60 g/l of a copolymer resin (hydroxyl group=0.41 equivalent/100 g) of 90 parts of 2-hydroxyethyl acrylate, 50 parts of methyl methacrylate, 15 parts of butyl acrylate, 20 parts of styrene, 25 parts of glycidyl methacrylate, 20 parts of methacrylic acid, 10 parts of acrylic acid and 1 part of an organic phosphorus monomer ("Phosmer M"); (b) 12 g/l of phosphoric acid; (c) 0.6 gram molecule/l of manganese phosphate; and (d) 20 g/l of colloidal silica having a particle size of 4–6 nm; and the resulting wet coating was dried at 110° C. to form a coating film in an amount of 0.30 g/m$^2$.

Example I-5

A Zn—Mg alloy-plated steel sheet (coating weight: 30 g/m$^2$, Mg=1.2%) was roll-coated with an aqueous composition containing (a) 60 g/l of a copolymer resin (hydroxyl group=0.26 equivalent/100 g) of 30 parts of N-methylolacrylamide, 20 parts of methyl methacrylate, 35 parts of butyl acrylate, 10 parts of styrene, 25 parts of glycidyl methacrylate, 40 parts of methacrylic acid and 20 parts of acrylic acid; (b) 10 g/l of phosphoric acid; and (c) 0.2 gram molecule/l of tin(II) phosphate; and the resulting wet coating was dried at 170° C. to form a coating film in an amount of 0.85 g/m$^2$.

Example I-6

A Zn—Ni alloy-plated steel sheet (coating weight: 20 g/m$^2$, Ni=12.4%) was roll-coated with an aqueous composition containing (a) 80 g/l of a copolymer resin (hydroxyl group=0.44 equivalent/100 g) of 80 parts of allyl glycidyl ether, 15 parts of methyl methacrylate, 35 parts of butyl acrylate, 10 parts of glycidyl methacrylate, 35 parts of methacrylic acid, 10 parts of acrylic acid and 10 parts of hydroxyethyl acrylate; (b) 15 g/l of phosphoric acid; and (c) 1.1 gram molecule/l of vanadium phosphate; and the wet coating was dried at 90° C. to form a coating film in an amount of 1.05 g/m$^2$.

Example I-7

A Zn—Mg alloy-plated steel sheet (coating weight: 30 g/m$^2$, Mg=1.2%) was roll-coated with an aqueous composition containing (a) 180 g/l of a copolymer resin (hydroxyl group=0.23 equivalent/100 g) of 25 parts of glycidyl methacrylate, 25 parts of ethyl methacrylate, 30 parts of butyl acrylate, 40 parts of methacrylic acid and 15 parts of hydroxyethyl acrylate; (b) 25 g/l of phosphoric acid; (c) 0.38 gram molecule/l of magnesium phosphate; and (d) 15 g/l of colloidal silica having a particle size of 10–12 nm and 2 g/l of MgO having a particle size of 4–6 nm; and the resulting wet coating was dried at 130° C. to form a coating film in an amount of 0.55 g/m$^2$.

Example I-8

A Zn—Ni alloy-plated steel sheet (coating weight: 30 g/m$^2$, Ni=13.9%) was roll-coated with an aqueous composition containing (a) 60 g/l of an organic copolymer resin (hydroxyl group=0.06 equivalent/100 g) of 15 parts of 2-hydroxyethyl acrylate, 60 parts of ethyl methacrylate, 40 parts of butyl acrylate, 50 parts of methacrylic acid and 35 parts of acrylic acid; (b) 15 g/l of phosphoric acid; (c) 0.8 gram molecule/l of barium phosphate; (d) 15 g/l of colloidal silica having a particle size of 4–6 nm and 1 g/l of MgO having a particle size of 7–8 nm; and the resulting wet coating was dried at 100° C. to form a coating film in an amount of 0.75 g/m$^2$.

Example I-9

A Zn—Cr alloy-plated steel sheet (coating weight: 20 g/m$^2$, Cr=10.8%) was roll-coated with an aqueous composition containing (a) 75 g/l of an organic copolymer resin (hydroxyl group=0.26 equivalent/100 g) of 35 parts of hydroxypropyl methacrylate, 25 parts of methyl methacrylate, 30 parts of butyl acrylate, 25 parts of glycidyl methacrylate and 50 parts of acrylic acid; (b) 15 g/l of phosphoric acid; (c) 0.7 gram molecule/l of aluminum phosphate; (d) 6 g/l of colloidal silica having a particle size of 10–12 nm and 0.5 g/l of MgO having a particle size of 2–3 nm; and the resulting wet coating was dried at 110° C. to form a coating film in an amount of 0.45 g/m$^2$.

Example I-10

A Zn—Ni alloy-plated steel sheet (coating weight: 20 g/m$^2$, Ni=12.1%) was roll-coated with an aqueous composition containing (a) 100 g/l of an organic copolymer resin (hydroxyl group=0.24 equivalent/100 g) of 40 parts of N-butoxymethylolmethacrylamide, 20 parts of methyl methacrylate, 55 parts of butyl acrylate, 35 parts of methacrylic acid, 10 parts of acrylic acid and 30 parts of hydroxyethyl acrylate; (b) 25 g/l of phosphoric acid; (c) 0.20 gram molecule/l of calcium phosphate; and (d) 25 g/l of colloidal silica having a particle size of 4–5 nm; and the resulting wet coating was dried at 80° C. to form a coating film in an amount of 0.50 g/m$^2$.

Example I-11

A Zn—Ni alloy-plated steel sheet (coating weight: 20 g/m², Ni=12.1%) was roll-coated with an aqueous composition containing (a) 80 g/l of an organic copolymer resin (hydroxyl group=0.44 equivalent/100 g) of 45 parts of allyl glycidyl ether, 30 parts of methyl methacrylate, 40 parts of butyl acrylate, 10 parts of methacrylic acid and 35 parts of hydroxyethyl acrylate; (b) 15 g/l of phosphoric acid; (c) 0.75 gram molecule/l of strontium phosphate; and (d) 20 g/l of colloidal silica having a particle size of 1–3 nm; and the resulting wet coating was dried at 115° C. to form a coating film in an amount of 0.75 g/m².

Example I-12

A Zn—Ni alloy-plated steel sheet (coating weight: 20 g/m², Ni=12.1%) was roll-coated with an aqueous composition containing (a) 90 g/l of an organic copolymer resin (hydroxyl group=0.27 equivalent/100 g) of 50 parts of glycidyl methacrylate, 40 parts of styrene, 50 parts of butyl acrylate, 15 parts of hydroxyethyl acrylate and 25 parts of methacrylic acid; (b) 25 g/l of phosphoric acid; (c) 0.05 mol/l of niobium(III) phosphate; and (d) 10 g/l of colloidal silica having a particle size of 7–8 nm; and the resulting coating was dried at 100° C. to form a coating film in an amount of 0.45 g/m².

Example I-13

A Zn—Ni alloy-plated steel sheet (coating weight: 20 g/m², Ni=12.8%) was roll-coated with an aqueous composition containing (a) 75 g/l of an organic copolymer resin (hydroxyl group=0.21 equivalent/100 g) of 55 parts of 3,4-epoxycyclohexyl methacrylate, 40 parts of methyl methacrylate, 40 parts of butyl acrylate, 40 parts of styrene, 20 parts of methacrylic acid and 20 parts of hydroxyethyl acrylate; (b) 15 g/l of phosphoric acid; (c) 0.15 gram molecule/l of yttrium phosphate; and (d) 9 g/l of colloidal silica having a particle size of 4–5 nm; and the resulting wet coating was dried at 85° C. to form a coating film in an amount of 0.40 g/m².

Example I-14

A Zn—Ni alloy-plated steel sheet (coating weight: 20 g/m², Ni=13.2%) was roll-coated with an aqueous composition containing (a) 90 g/l of an organic copolymer resin (hydroxyl group=0.19 equivalent/100 g) of 40 parts of 2-ethylhexyl acrylate, 50 parts of butyl acrylate, 35 parts of methacrylic acid and 35 parts of hydroxyethyl acrylate; (b) 30 g/l of phosphoric acid; (c) 0.37 gram molecule/l of zinc phosphate; and (d) 6 g/l of colloidal silica having a particle size of 1–3 nm; and the resulting wet coating was dried at 115° C. to form a coating film in an amount of 0.40 g/m².

Comparative Example I-1

A Zn—plated steel sheet was roll-coated with an aqueous composition containing 15 g/l of chromic acid (chromic acid of 100% hexavalent Cr) and 10 g/l of phosphoric acid, and the resulting wet coating was dried at 175° C. to form a chromate coating film in an amount of 45 mg/m², calculated as Cr.

Comparative Example I-2

A Zn—Ni alloy-plated steel sheet (coating weight: 20 g/m², Ni=12.8%) was roll-coated with an aqueous composition containing 15 g/l of chromic acid (chromic acid of 100% hexavalent Cr), 15 g/l of phosphoric acid and 5 g/l of colloidal silica having a particle size of 30–35 nm, and the wet coating was dried at 195° C. to form a chromate coating film in an amount of 57 mg/m², calculated as Cr.

Comparative Example I-3

A Zn—Ni alloy-plated steel sheet (coating weight: 20 g/m², Ni=12.9%) was roll-coated with an aqueous composition containing 20 g/l of chromic acid (chromic acid of 100% hexavalent Cr), 30 g/l of phosphoric acid and 80 g/l of an acrylic emulsion (hydroxyl group=0 equivalent/100 g), and the wet coating was dried at 180° C. to form a chromate coating film in an amount of 48 mg/m², calculated as Cr.

Comparative Example I-4

A Zn—Ni alloy-plated steel sheet (coating weight: 20 g/m², Ni=12.3%) was roll-coated with an aqueous composition containing 25 g/l of chromic acid (chromic acid of 100% hexavalent Cr), 15 g/l of phosphoric acid and 60 g/l of an acrylamide resin, and the wet coating was dried at 130° C. to form a coating film in an amount of 0.55 g/m².

Comparative Example I-5

A Zn—Ni alloy-plated steel sheet (coating weight: 20 g/m², Ni=12.9%) was roll-coated with an aqueous composition containing 25 g/l of chromic acid (100×trivalent Cr/(trivalent Cr+hexavalent Cr)=30%), 10 g/l of phosphoric acid, 60 g/l of an acrylic emulsion and 15 g/l of colloidal silica having a particle size of 20–25 nm, and the wet coating was dried at 175° C. to form a coating film in an amount of 0.65 g/m².

TABLE 1

|  | Adhesion of coating film to substrate | Post-processing bare corrosion resistance (salt spraying time: hours) | | | | | | | | | Overcoat adhesion |
|---|---|---|---|---|---|---|---|---|---|---|---|
|  |  | 100 | 200 | 400 | 600 | 1000 | 1500 | 2000 | 3000 | 4000 |  |
| Ex. I-1 | A | A | A | A | A | A | B | C | D | D | A |
| Ex. I-2 | A | A | A | A | A | A | A | A | B | C | A |
| Ex. I-3 | A | A | A | A | A | A | B | B | C | D | A |
| Ex. I-4 | A | A | A | A | A | A | A | A | B | D | A |
| Ex. I-5 | A | A | A | A | A | A | A | A | B | C | A |
| Ex. I-6 | A | A | A | A | A | A | A | A | B | C | A |
| Ex. I-7 | A | A | A | A | A | A | A | B | C | D | A |
| Ex. I-8 | A | A | A | A | A | A | A | B | C | D | A |
| Ex. I-9 | A | A | A | A | A | A | A | A | C | D | A |

TABLE 1-continued

|  | Adhesion of coating film to substrate | Post-processing bare corrosion resistance (salt spraying time: hours) | | | | | | | | | Overcoat adhesion |
|---|---|---|---|---|---|---|---|---|---|---|---|
|  |  | 100 | 200 | 400 | 600 | 1000 | 1500 | 2000 | 3000 | 4000 |  |
| Ex. I-10 | A | A | A | A | A | A | A | A | B | C | D | A |
| Ex. I-11 | A | A | A | A | A | A | A | A | B | C | D | A |
| Ex. I-12 | A | A | A | A | A | A | A | A | C | D | D | A |
| Ex. I-13 | A | A | A | A | A | A | A | A | B | D | D | A |
| Ex. I-14 | A | A | A | A | A | A | A | A | B | D | D | A |

TABLE 2

|  | Adhesion of coating film to substrate | Post-processing bare corrosion resistance (salt spraying time: hours) | | | | | | | | | Overcoat adhesion |
|---|---|---|---|---|---|---|---|---|---|---|---|
|  |  | 100 | 200 | 400 | 600 | 1000 | 1500 | 2000 | 3000 | 4000 |  |
| Comp. Ex. I-1 | D | E | — | — | — | — | — | — | — | — | C |
| Comp. Ex. I-2 | D | E | — | — | — | — | — | — | — | — | C |
| Comp. Ex. I-3 | D | A | B | D | E | — | — | — | — | — | D |
| Comp. Ex. I-4 | D | A | B | B | C | D | — | — | — | — | B |
| Comp. Ex. I-5 | D | A | A | B | B | D | D | — | — | — | B |

Table 1 shows the test results of the film samples obtained in Examples I-1 to I-14, and Table 2 shows those of Comparative Examples I-1 to I-5. The surface-treated Zn— or Zn alloy-plated steel sheets were tested for: adhesion of the overcoat film after being immersed in boiling water for 30 minutes; corrosion resistance after bending process according to the salt spray test; and adhesion of an overcoat of a melamine-containing low temperature baking coating composition (baking temperature=110° C.) having a thickness of 30 µm.

Table 1 clearly shows the following. When Zn— or Zn alloy-plated steel sheets were surface-treated according to the present invention, the coating films formed had good adhesion and no peeling occurred. As for post-processing bare corrosion resistance, surfaces of the surface-treated Zn-plated steel sheets according to the invention hardly changed after 1000 hours of salt spraying, and red rust slightly occurred after 1500 hours. Also, surfaces of the surface-treated Zn alloy-plated steel sheets according to the invention hardly changed after 2000 hours, and red rust slightly occurred only after 3000 hours.

On the other hand, as apparent from Table 2, coating films of known chromate compositions (Comparative Examples I-1 to I-5) were poor in adhesion. A considerable amount of chromium was flowed out in boiling water or coating films were peeled off seriously, regardless of the kind of surface-treating composition.

Furthermore, coating films of known inorganic chromate compositions (Comparative Examples I-1 and I-2) had poor post-processing bare corrosion resistance, so that red rust occurred considerably extensively after 100 hours of salt spraying. In the case of post-processing bare corrosion resistance of resin chromates (Comparative Examples I-3 and I-4), red rust occurred considerably after 600 hours of salt spraying.

Concerning overcoat adhesion as well, the coating films of the surface-treating compositions of the invention were highly satisfactory. A coating of a low temperature (110° C.) baking coating composition—which generally exhibits poor adhesion—adhered strongly to the coating films of the surface-treating compositions of the invention. On the other hand, the adhesion of this overcoat to the coating films of known chromates (Comparative Examples I-1 to I-3) was very poor. The outer coating did not adhere strongly enough even to coating films made of chromate and an organic resin (Comparative Examples I-4 and I-5), and partially peeled off.

In the following examples and comparative examples, each of the metal ions was used in the form of a metal ion solution prepared by mixing a powder each of the metals with a suitable amount of phosphoric acid ($H_3PO_4$), and heating the mixture to dissolve the metal particles therein.

Example II-1

A Zn-plated steel sheet (coating weight: 20 g/m$^2$) was roll-coated with an aqueous composition containing (a) 60 g/l of a copolymer resin (hydroxyl group=0.18 equivalent/100 g) of 40 parts of 2-hydroxybutyl acrylate, 15 parts of methyl methacrylate, 35 parts of butyl acrylate, 20 parts of styrene, 40 parts of methacrylic acid, 3 parts of acrylic acid and 2 parts of an organic phosphorus monomer ("Phosmer M"), (b) 10 g/l of phosphoric acid and (c) 0.15 gram ion/l of $Mg^{++}$. The coated sheet was dried at 120° C. to form a coating film in an amount of 0.35 g/m$^2$.

Example II-2

A Zn—Ni alloy-plated steel sheet (coating weight: 20 g/m$^2$, Ni=11.5%) was roll-coated with an aqueous composition containing (a) 80 g/l of a copolymer resin (hydroxyl group=0.14 equivalent/100 g) of 15 parts of 2-hydroxyethyl acrylate, 35 parts of methyl methacrylate, 47 parts of butyl acrylate, 10 parts of glycidyl methacrylate, 30 parts of methacrylic acid, 3 parts of acrylic acid and 1 part of an organic phosphorus monomer ("Phosmer M"), (b) 25 g/l of phosphoric acid, (c) 0.5 gram ion/l of $Fe^{++}$ and (d) 9 g/l of colloidal silica having a particle size of 7–8 nm. The coated sheet was dried at 130° C. to form a coating film in an amount of 0.45 $g/m^2$.

Example II-3

A Zn—Ni alloy-plated steel sheet (coating weight: 20 $g/m^2$, Ni=12.3%) was coated with an aqueous composition containing (a) 60 g/l of a copolymer resin (hydroxyl group=0.53 equivalent/100 g) of 70 parts of 2,3-dihydroxypropyl methacrylate, 20 parts of methyl methacrylate, 45 parts of butyl acrylate, 20 parts of glycidyl methacrylate, 30 parts of methacrylic acid, 5 parts of acrylic acid and 1 part of an organic phosphorus monomer ("Phosmer M"), (b) 15 g/l of phosphoric acid, (c) 0.8 gram ion/l of $Al^{+++}$ and (d) 12 g/l of colloidal silica having a particle size of 2–3 nm. The coated sheet was dried at 60° C. to form a coating film in an amount of 0.45 $g/m^2$.

The obtained film was roll-coated with an aqueous composition containing an organic resin prepared by copolymerizing 30 parts of methyl methacrylate, 37 parts of butyl acrylate, 10 parts of glycidyl methacrylate, 40 parts of methacrylic acid, 3 parts of acrylic acid and 1 part of an organic phosphorus monomer ("Phosmer M"). The coated sheet was dried at 150° C. to form a coating film of the organic resin having a coating weight of 1.3 $g/m^2$, giving an organic composite coated steel sheet.

Example II-4

A Zn—Fe alloy-plated steel sheet (coating weight: 20 $g/m^2$, Fe=12.8%) was roll-coated with an aqueous composition containing (a) 60 g/l of a copolymer resin (hydroxyl group=0.41 equivalent/100 g) of 80 parts of 2-hydroxyethyl acrylate, 40 parts of methyl methacrylate, 20 parts of butyl acrylate, 10 parts of styrene, 15 parts of glycidyl methacrylate, 20 parts of methacrylic acid, 10 parts of acrylic acid and 1 part of an organic phosphorus monomer ("Phosmer M"), (b) 15 g/l of phosphoric acid, (c) 0.6 gram ion/l of $Ba^{++}$ and (d) 25 g/l of colloidal silica having a particle size of 10–12 nm. The coated sheet was dried at 100° C. to form a coating film in an amount of 0.25 $g/m^2$.

The obtained coating film was roll-coated with an aqueous composition containing 100 parts of a copolymer resin of 10 parts of methyl methacrylate, 40 parts of butyl acrylate, 20 parts of styrene, 10 parts of glycidyl methacrylate, 40 parts of methacrylic acid and 1 part of an organic phosphorus monomer ("Phosmer M") and 25 parts of colloidal silica having a particle size of 10–12 nm. The coated sheet was dried at 150° C. to form a coating film having a coating weight of 1.5 $g/m^2$ and composed of 100 parts of the organic resin and 25 parts of the colloidal silica, giving an organic composite coated steel sheet.

Example II-5

A Zn—Mg alloy-plated steel sheet (coating weight: 30 $g/m^2$, Mg=1.2%) was roll-coated with an aqueous composition containing (a) 60 g/l of a copolymer resin (hydroxyl group=0.25 equivalent/100 g) of 25 parts of N-methylolacrylamide, 25 parts of methyl methacrylate, 30 parts of butyl acrylate, 5 parts of styrene, 20 parts of glycidyl methacrylate, 40 parts of methacrylic acid and 10 parts of acrylic acid, (b) 20 g/l of phosphoric acid and (c) 0.1 gram ion/l of $Ca^{++}$. The coated sheet was dried at 150° C. to form a coating film in an amount of 0.35 $g/m^2$.

The obtained coating film was roll-coated with an aqueous composition containing 100 parts of an olefin/acrylic acid copolymer resin and 25 parts of colloidal silica having a particle size of 1–3 nm. The coated sheet was dried at 145° C. to form a coating film having a coating weight of 1.1 $g/m^2$ and composed of 100 parts of the olefin/acrylic acid copolymer resin and 25 parts of the colloidal silica, giving an organic composite coated steel sheet.

Example II-6

A Zn—Ni alloy-plated steel sheet (coating weight: 20 $g/m^2$, Ni=12.4%) was roll-coated with an aqueous composition containing (a) 80 g/l of a copolymer resin (hydroxyl group=0.47 equivalent/100 g) of 80 parts of allyl glycidyl ether, 10 parts of methyl methacrylate, 30 parts of butyl acrylate, 15 parts of glycidyl methacrylate, 40 parts of methacrylic acid, 10 parts of acrylic acid and 15 parts of hydroxyethyl acrylate, (b) 20 g/l of phosphoric acid and (c) 1.1 gram ion/l of $Sr^{++}$. The coated sheet was dried at 90° C. to form a coating film in an amount of 0.55 $g/m^2$.

The obtained coating film was roll-coated with an aqueous composition containing 100 parts of an olefin/acrylic acid copolymer resin and 20 parts of colloidal silica having a particle size of 7–8 nm. The coated sheet was dried at 160° C. to form of a coating film having a coating weight of 1.35 $g/m^2$ and composed of 100 parts of the olefin/acrylic acid copolymer resin and 20 parts of the colloidal silica, giving an organic composite coated steel sheet.

Example II-7

A Zn—Mg alloy-plated steel sheet (coating weight: 30 $g/m^2$, Mg=1.2%) was roll-coated with an aqueous composition containing (a) 180 g/l of a copolymer resin (hydroxyl group=0.31 equivalent/100 g) of 35 parts of glycidyl methacrylate, 20 parts of ethyl methacrylate, 25 parts of butyl acrylate, 35 parts of methacrylic acid and 20 parts of hydroxyethyl acrylate, (b) 40 g/l of phosphoric acid, (c) 0.25 gram ion/l of $Nb^{+++}$, and (d) 15 g/l of colloidal silica having a particle size of 10–12 nm and 3 g/l of MgO having a particle size of 4–6 nm. The coated sheet was dried at 110° C. to form a coating film in an amount of 0.45 $g/m^2$.

The obtained coating film was roll-coated with an aqueous composition containing an organic resin prepared by copolymerizing 10 parts of methyl methacrylate, 30 parts of butyl acrylate, 15 parts of glycidyl methacrylate, 35 parts of methacrylic acid, 10 parts of acrylic acid and 15 parts of hydroxyethyl acrylate. The coated sheet was dried at 160° C. to form a coating film having a coating weight of 1.2 $g/m^2$ and composed of the organic resin, giving an organic composite coated steel sheet.

Example II-8

A Zn—Ni alloy-plated steel sheet (coating weight: 30 $g/m^2$, Ni=13.9%) was roll-coated with an aqueous composition containing (a) 60 g/l of an organic resin (hydroxyl group=0.20 equivalent/100 g) prepared by copolymerizing 10 parts of glycidyl methacrylate, 50 parts of ethyl methacrylate, 35 parts of butyl acrylate, 40 parts of methacrylic acid and 30 parts of 2-hydroxyethyl acrylate, (b) 15 g/l of phosphoric acid, (c) 0.25 gram ion/l of $Nb^{+++++}$, and (d) 15 g/l of colloidal silica having a particle size of 4–6 nm and 3 g/l of MgO having a particle size of 2–3 nm. The coated sheet was dried at 110° C. to form a coating film in an amount of 0.60 g/m².

The obtained coating film was roll-coated with an aqueous composition containing 25 parts of $SiO_2$ powder having a particle size of 10–12 nm and 100 parts of an organic resin prepared by copolymerizing 15 parts of methyl methacrylate, 35 parts of butyl acrylate, 15 parts of glycidyl methacrylate, 40 parts of methacrylic acid and 5 parts of acrylic acid. The coated sheet was dried at 160° C. to form a coating film having a coating weight of 1.1 g/m² and composed of 100 parts of the organic resin and 25 parts of $SiO_2$, giving an organic composite coated steel sheet.

Example II-9

A Zn—Cr alloy-plated steel sheet (coating weight: 20 g/m², Cr=10.8%) was roll-coated with an aqueous composition containing (a) 60 g/l of an organic resin (hydroxyl group=0.28 equivalent/100 g) prepared by copolymerizing 40 parts of hydroxypropyl methacrylate, 18 parts of methyl methacrylate, 30 parts of butyl acrylate, 20 parts of glycidyl methacrylate and 41 parts of acrylic acid, (b) 15 g/l of phosphoric acid, (c) 0.30 gram ion/l of $Y^{+++}$, and (d) 6 g/l of colloidal silica having a particle size of 2–3 nm and 0.5 g/l of MgO having a particle size of 8–10 nm. The coated sheet was dried at 110° C. to form a coating film in an amount of 0.15 g/m².

The obtained coating film was roll-coated with an aqueous composition containing a vinyl-modified epoxy resin. The coated sheet was dried at 135° C. to form a coating film of the vinyl-modified epoxy resin having a coating weight of 1.6 g/m², giving an organic composite coated steel sheet.

Example II-10

A Zn—Ni alloy-plated steel sheet (coating weight: 20 g/m², Ni=12.1%) was roll-coated with an aqueous composition containing (a) 100 g/l of an organic resin (hydroxyl group=0.28 equivalent/100 g) prepared by copolymerizing 45 parts of N-butoxymethylol-methacrylamide, 15 parts of methyl methacrylate, 35 parts of butyl acrylate, 40 parts of methacrylic acid, 5 parts of acrylic acid and 25 parts of hydroxyethyl acrylate, (b) 40 g/l of phosphoric acid, (c) 0.35 gram ion/l of $Zn^{++}$ and (d) 15 g/l of colloidal silica having a particle size of 7–8 nm. The coated sheet was dried at 90° C. to form a coating film in an amount of 0.38 g/m².

The obtained coating film was roll-coated with an aqueous composition containing 100 parts of a urethane-modified epoxy ester resin and 25 parts of $SiO_2$ powder having a particle size of 8–10 nm. The coated sheet was-dried at 145° C. to form a coating film having a coating weight of 1.4 g/m² and composed of 100 parts of the urethane-modified epoxy ester resin and 25 parts of the $SiO_2$ powder, giving an organic composite coated steel sheet.

Example II-11

A Zn—Ni alloy-plated steel sheet (coating weight: 20 g/m², Ni=12.1%) was roll-coated with an aqueous composition containing (a) 80 g/l of an organic resin (hydroxyl group=0.44 equivalent/100 g) prepared by copolymerizing 50 parts of allyl glycidyl ether, 20 parts of methyl methacrylate, 50 parts of butyl acrylate, 10 parts of methacrylic acid and 30 parts of hydroxyethyl acrylate, (b) 20 g/l of phosphoric acid, (c) 0.35 gram ion/l of $Mg^{++}$ and (d) 13 g/l of colloidal silica having a particle size of 10–12 nm. The coated sheet was dried at 115° C. to form a coating film in an amount of 0.45 g/m².

The obtained coating film was roll-coated with an aqueous composition containing 100 parts of a urethane-modified epoxy ester resin and 20 parts of $SiO_2$ powder having a particle size of 8–10 nm. The coated sheet was dried at 145° C. to form 1.2 g/m² of a coating film composed of 100 parts of the urethane-modified polyester resin and 20 parts of the $SiO_2$ powder, giving an organic composite coated steel sheet.

Example II-12

A Zn—Ni alloy-plated steel sheet (coating weight: 20 g/m², Ni=12.1%) was roll-coated with an aqueous composition containing (a) 90 g/l of an organic resin (hydroxyl group=0.24 equivalent/100 g) prepared by copolymerizing 45 parts of β-methylglycidyl acrylate, 30 parts of styrene, 60 parts of butyl acrylate, 10 parts of hydroxyethyl acrylate and 20 parts of methacrylic acid, (b) 25 g/l of phosphoric acid, (c) 0.27 gram ion/l of $Al^{+++}$ and (d) 10 g/l of colloidal silica having a particle size of 4–6 nm. The coated sheet was dried at 100° C. to form a coating film in an amount of 0.52 g/m².

The obtained coating film was roll-coated with an aqueous composition containing 100 parts of a vinyl-modified epoxy ester resin and 25 parts of colloidal silica having a particle size of 2–3 nm. The coated sheet was dried at 155° C. to form 1.8 g/m² of a coating film composed of 100 parts of the vinyl-modified epoxy ester resin and 25 parts of the colloidal silica, giving an organic composite coated steel sheet.

Example II-13

A Zn—Ni alloy-plated steel sheet (coating weight: 20 g/m², Ni=12.8%) was roll-coated with an aqueous composition containing (a) 80 g/l of an organic resin (hydroxyl group=0.23 equivalent/100 g) prepared by copolymerizing 60 parts of 3,4-epoxycyclohexyl methacrylate, 35 parts of methyl methacrylate, 45 parts of butyl acrylate, 20 parts of styrene, 15 parts of methacrylic acid and 15 parts of hydroxyethyl acrylate, (b) 15 g/l of phosphoric acid, (c) 0.30 gram ion/l of $Ba^{++}$ and (d) 9 g/l of colloidal silica having a particle size of 2–3 nm. The coated sheet was dried at 90° C. to form a coating film in an amount of 0.35 g/m².

The obtained coating film was roll-coated with an aqueous composition containing 100 parts of an olefin/acrylic acid copolymer resin and 25 parts of colloidal silica having a particle size of 2–3 nm. The coated sheet was dried at 150° C. to form 1.6 g/m² of a coating film composed of 100 parts of the olefin/acrylic acid copolymer resin and 25 parts of the colloidal silica, giving an organic composite coated steel sheet.

Example II-14

A Zn—Ni alloy-plated steel sheet (coating weight: 20 g/m², Ni=13.2%) was roll-coated with an aqueous composition containing (a) 90 g/l of an organic resin (hydroxyl group=0.14 equivalent/100 g) prepared by copolymerizing 50 parts of ethylhexyl acrylate, 40 parts of butyl acrylate, 35 parts of methacrylic acid and 25 parts-of hydroxyethyl acrylate, (b) 40 g/l of phosphoric acid, (c) 0.35 gram ion/l of $Ca^{++}$ and (d) 6 g/l of colloidal silica having a particle size of 7–8 nm. The coated sheet was dried at 100° C. to form a coating film in an amount of 0.27 g/m².

The obtained coating film was roll-coated with an aqueous composition containing 100 parts of an olefin/acrylic acid copolymer resin and 25 parts of colloidal silica having a particle size of 4–6 nm. The coated sheet was dried at 150°

C. to form 1.3 g/m² of a coating film consisting of 100 parts of the olefin/acrylic acid copolymer resin and 25 parts of the colloidal silica, giving an organic composite coated steel sheet.

Comparative Example II-1

A Zn-plated steel sheet was roll-coated with an aqueous composition containing 20 g/l of chromic acid (chromic acid of 100% hexavalent Cr) and 15 g/l of phosphoric acid. The coated sheet was dried at 180° C. to form a chromate coating film in an amount of 57 mg/m², calculated as Cr.

Comparative Example II-2

A Zn—Ni alloy-plated steel sheet (coating weight: 20 g/m², Ni=12.8%) was roll-coated with an aqueous composition containing 20 g/l of chromic acid (chromic acid of 100% hexavalent Cr), 20 g/l of phosphoric acid and 10 g/l of colloidal silica having a particle size of 25–30 nm. The coated sheet was dried at 190° C. to form a chromate coating film in an amount of 52 mg/m², calculated as Cr.

Comparative Example II-3

A Zn—Ni alloy-plated steel sheet (coating weight: 20 g/m², Ni=12.9%) was roll-coated with an aqueous composition containing 20 g/l of chromic acid (chromic acid of 100% hexavalent Cr), 25 g/l of phosphoric acid and 100 g/l of acrylic emulsion. The coated sheet was dried at 160° C. to form a chromate coating film in an amount of 55 mg/m², calculated as Cr.

Comparative Example II-4

A Zn—Ni alloy-plated steel sheet (coating weight: 20 g/m², Ni=12.5%) was roll-coated with an aqueous composition containing 30 g/l of chromic acid (chromic acid of 100% hexavalent Cr), 80 g/l of an acrylamide resin, 15 g/l of phosphoric acid, 0.25 gram ion/l of $Cu^{++}$ and 15 g/l of $SiO_2$ powder having a particle size of 20–25 nm. The coated sheet was dried at 170° C. to form a coating film in an amount of 0.53 g/m².

Comparative Example II-5

A Zn—Ni alloy-plated steel sheet (coating weight: 20 g/m², Ni=12.3%) was roll-coated with an aqueous composition containing 20 g/l of chromic acid (chromic acid of 100% hexavalent Cr), 10 g/l of phosphoric acid and 80 g/l of acrylamide resin. The coated sheet was dried at 115° C. to form a coating film in an amount of 0.48 g/m².

The obtained coating film was roll-coated with an aqueous composition containing an epoxy resin and dried at 175° C. to form 1.15 g/m² of a coating film of the epoxy resin, giving an organic composite coated steel sheet.

Comparative Example II-6

A Zn—Ni alloy-plated steel sheet (coating weight: 20 g/m², Ni=12.9%) was roll-coated with an aqueous composition containing 30 g/l of chromic acid (100× trivalent Cr/(trivalent Cr+hexavalent Cr)=30 (%)), 15 g/l of phosphoric acid, 80 g/l of an acrylic emulsion and 15 g/l of colloidal silica having a particle size of 8–10 nm. The coated sheet was dried at 160° C. to form a coating film in an amount of 0.46 g/m².

The obtained coating film was roll-coated with an aqueous composition containing 100 parts of an epoxy resin and 25 parts of $SiO_2$ powder having a particle size of 20–25 nm and dried at 185° C. to form 1.45 g/m² of a coating film of the epoxy resin and the $SiO_2$ powder, giving an organic composite coated steel sheet.

The coating films formed on the Zn— or Zn alloy-plated steel sheets in Examples II-1 to II-14 and Comparative Examples II-1 to II-6 were tested for properties, i.e., adhesion to the plated steel sheets evaluated by immersing the coated sheet in boiling water for 30 minutes, post-processing bare corrosion resistance evaluated by the salt spray test, and overcoat adhesion observed when a melamine-containing low-temperature baking coating composition (baking temperature: 110° C.) was applied to a thickness of 30μ as the outer coating film (overcoat). Table 3 shows the results.

As apparent from Table 3, when the Zn— or Zn alloy-plated steel sheets were surface-treated according to the present invention, the formed coating films were good in adhesion and totally free from peeling. When the Zn-plated steel was surface-treated according to the invention and subjected to the post-processing bare corrosion resistance test, the surface scarcely changed after 1000 hours and only a slight amount of red rust was found after 1500 hours. When the Zn alloy-plated steel sheets were surface-treated according to the invention and subjected to the post-processing bare corrosion resistance test, the surfaces scarcely changed after 2000 hours and only a slight amount of red rust was found after 3000 hours.

In the case of the organic composite coated steel sheet prepared by surface-treating a plated steel sheet with the composition of the invention and then applying the organic resin of the invention to the surface-treated surfaces, the post-processing bare corrosion resistance thereof was such that only a slight amount of red rust was found on some of the organic composite coated steel sheets after 4000 hours.

On the other hand, as apparent from Table 4, the coating films formed from the known chromate-containing compositions (Comparative Example II-1 to II-6) are poor in adhesion. That is to say, a considerable amount of chromium was flowed out in the boiling water, or the coating films were seriously peeled off.

Further, when the coating films formed from the known compositions containing inorganic chromate (Comparative Examples II-1 and II-2) were subjected to the post-processing bare corrosion resistance test, a considerable amount of red rust was found after 100 hours. In the case of the known compositions containing resin chromate (Comparative Examples II-3 and II-4), a considerable amount of red rust was found after 400 hours.

Concerning overcoat adhesion as well, the plated steel sheets treated with the surface-treating composition of the invention and optionally further coated with an organic coating film have very good adhesion even to a low-temperature baking coating composition (baking temperature: 110° C.) which hardly exhibits good adhesion.

On the other hand, the known chromate coating films (Comparative Examples II-1 to II-4) have very poor overcoat adhesion. Further, even when an organic resin is added to the chromate coating compositions (Comparative Examples II-5 to II-6), overcoat adhesion is not always satisfactory, resulting in the peeling of the outer coating film (overcoat).

TABLE 3

| | Adhesion of coating film to substrate | Post-processing bare corrosion resistance (salt spraying time: hours) | | | | | | | | | Overcoat adhesion |
|---|---|---|---|---|---|---|---|---|---|---|---|
| | | 100 | 200 | 400 | 600 | 1000 | 1500 | 2000 | 3000 | 4000 | |
| Ex. II-1 | A | A | A | A | A | A | B | C | D | D | A |
| Ex. II-2 | A | A | A | A | A | A | A | B | C | D | A |
| Ex. II-3 | A | A | A | A | k | A | A | A | B | C | A |
| Ex. II-4 | A | A | A | A | A | A | A | A | B | B | A |
| Ex. II-5 | A | A | A | A | A | A | A | A | B | C | A |
| Ex. II-6 | A | A | A | A | A | A | A | A | A | B | A |
| Ex. II-7 | A | A | A | A | A | A | A | A | B | B | A |
| Ex. II-8 | A | A | A | A | A | A | A | A | A | B | A |
| Ex. II-9 | A | A | A | A | A | A | A | A | B | B | A |
| Ex. II-10 | A | A | A | A | A | A | A | A | A | B | A |
| Ex. II-11 | A | A | A | A | A | A | A | A | A | B | A |
| Ex. II-12 | A | A | A | A | A | A | A | A | A | A | A |
| Ex. II-13 | A | A | A | A | A | A | A | A | A | A | A |
| Ex. II-14 | A | A | A | A | A | A | A | A | A | A | A |

TABLE 4

| | Adhesion to plated steel sheet | Post-processing bare corrosion resistance (Period of Salt Spray Test: hour) | | | | | | | | | Overcoat adhesion |
|---|---|---|---|---|---|---|---|---|---|---|---|
| | | 100 | 200 | 400 | 600 | 1000 | 1500 | 2000 | 3000 | 4000 | |
| Comp. Ex. II-1 | D | E | — | — | — | — | — | — | — | — | C |
| Comp. Ex. II-2 | D | D | E | E | — | — | — | — | — | — | C |
| Comp. Ex. II-3 | D | A | B | D | D | — | — | — | — | — | D |
| Comp. Ex. II-4 | D | D | E | E | — | — | — | — | — | — | C |
| Comp. Ex. II-5 | D | A | A | B | C | D | — | — | — | — | B |
| Comp. Ex. II-6 | D | A | A | B | C | D | D | D | — | — | B |

As described above, the surface-treating composition according to the present invention is a chromium-free agent which causes no environmental pollution, and can be employed as a substitute for any chromate composition conventionally used in the fields of automobiles, household appliances and construction materials, such as coating chromating, electrolytic chromating, resinous chromating and reactive chromating. Since the composition of the invention is free from chromium and causes no environmental pollution, said composition will find wide application as in containers, tableware, toys, construction materials for interior, etc.

In the following production examples of Resins A-1 to A-11 and Resins B-1 to B-3, the term "calculated hydroxyl group content" refers to the amount of —OH group(s) of the resin, or the total amount of —OH group(s) and at least one of glycidyl, aldehyde and amino groups when the resin contains at least one of glycidyl, aldehyde and amino groups in addition to —OH group(s).

Production of Resin A-1

A glass flask equipped with a stirrer, a thermometer and a partial reflux condenser was charged with 427 parts of dimethyl terephthalate, 427 parts of dimethyl isophthalate, 148 parts of dimethyl 5-sodium sulfoisophthalate, 434 parts of ethylene glycol, 406 parts of neopentyl glycol and 0.52 parts of tetra-n-butyl titanate. The mixture was heated from 160° C. to 220° C. over 4 hours to carry out transesterification. The reaction system was then heated to 280° C. and the pressure of the system was gradually reduced and the reaction was carried out for 0.5 hour under a reduced pressure of 0.2 mmHg, giving a polyester. The obtained polyester had a weight average molecular weight of 4,000, as measured by GPC (gel permeation chromatography).

A reactor equipped with a stirrer, a thermometer and a reflux condenser was charged with 100 parts of the obtained polyester, 100 parts of methyl ethyl ketone and 30 parts of isopropyl alcohol, and the mixture was heated to dissolve the polyester. Then, 200 parts of water was added to disperse the polyester resin. The dispersion was gradually heated to 100° C. to distill off the solvents from the system, giving the final desired aqueous dispersion. The calculated hydroxyl group content of the resulting resin was 0.05 equivalent/100 g.

Production of Resin A-2

A stainless steel autoclave equipped with a stirrer, a thermometer and a partial reflux condenser was charged with 466 parts of dimethyl terephthalate, 466 parts of dimethyl isophthalate, 401 parts of neopentyl glycol, 443 parts of ethylene glycol and 0.52 part of tetra-n-butyl titanate. The mixture was heated from 160° C. to 220° C. over a period of 4 hours to carry out transesterification. Then, 23 parts of fumaric acid was added and the resulting mixture was heated from 200° C. to 220° C. over a period of 1 hour to carry out esterification. The reaction system was heated to 255° C. and the pressure in the system was gradually reduced, and the reaction was carried out for 1.5 hours under a reduced pressure of 0.2 mmHg, giving a polyester. The obtained polyester was transparent and a pale yellow, and had a weight average molecular weight of 23,000, as measured by GPC.

A reactor equipped with a stirrer, a thermometer and a reflux condenser was charged with 75 parts of the obtained polyester, 80 parts of methyl ethyl ketone and 20 parts of isopropyl alcohol, and the mixture was heated for dissolution. Then, 10 parts of maleic anhydride was added thereto, and the complete dissolution was confirmed. Then, to the resulting solution was added dropwise a solution of 7 parts of styrene, 8 parts of triethylamine salt of 2-acrylamide-2-methylpropanesulfonic acid, 4 parts of ethyl acrylate and 1.5 parts of azobisisobutyronitrile in 25 parts of methyl ethyl ketone over a period of 2 hours to thereby carry out polymerization of monomers. After carrying out polymerization for 4 hours, 9 parts of propylene glycol was added to the reaction system to convert the maleic anhydride into a half ester of propylene glycol. A solution of 10 parts of triethylamine in 20 parts of isopropyl alcohol was added for neutralization, and 200 parts of water was added to give an aqueous dispersion. The dispersion was gradually heated to 100° C. to distill off the solvents from the system, giving the final aqueous resin. The calculated hydroxyl group content of the resulting resin was 0.09 equivalent/100 g.

Production of Resin A-3

A reactor equipped with a stirrer, a thermometer and a reflux condenser was charged with 100 parts of a bisphenol A type epoxy resin (product of Toto Kasei, YD-019) and 100 parts of methyl ethyl ketone, and the mixture was heated to dissolve the resin. In the solution were dissolved 8 parts of trimellitic anhydride and 2 parts of 5-sodium sulfoisophthalic acid, and after confirming complete dissolution, 0.5 part of pyridine was added and the reaction was carried out under reflux for 6 hours. After neutralizing the reaction system with 6 parts of 28% aqueous ammonia, 25 parts of tetrahydrofuran and 230 parts of water were added to give an aqueous dispersion. The dispersion was heated to 100° C. to distill off the solvents from the system, giving the final aqueous dispersion. The calculated hydroxyl group content of the resulting resin was 0.32 equivalent/100 g.

Production of Resin A-4

A reactor equipped with a stirrer, a thermometer and a reflux condenser was charged with 100 parts of dimethylformamide, 40 parts of styrene, 40 parts of maleic anhydride and 20 parts of acrylamide methylpropanesulfonic acid. After dissolution, 5 parts of azobisisobutyronitrile was added to carry out reaction at 80° C.–100° C. for 4 hours, giving a copolymer of styrene, maleic anhydride and 2-acrylamido-2-methylpropanesulfonic acid. The copolymer was isolated by reprecipitation with isopropyl alcohol and dried under reduced pressure.

Subsequently, a reactor equipped with a stirrer, a thermometer and a reflux condenser was charged with 50 parts of a bisphenol F type epoxy resin (product of Toto Kasei, YDF-2004) and 100 parts of methyl ethyl ketone, and the mixture was heated to dissolve the resin. To the solution was added 50 parts of the dried copolymer of styrene, maleic anhydride and 2-acrylamido-2-methylpropanesulfonic acid, and 0.5 part of pyridine was further added thereto to carry out the reaction between the maleic anhydride moiety and the epoxy group of the epoxy resin under reflux for 2 hours. To the reaction system were successively added 20 parts of triethylamine, 30 parts of ethanol and 200 parts of water to give an aqueous dispersion. The dispersion was heated to 100° C. to distill off the solvents from the system, giving the final aqueous dispersion. The calculated hydroxyl group content of the resulting resin was 0.17 equivalent/100 g.

Production of Resin A-5

A reactor equipped with a stirrer, a thermometer and a reflux condenser was charged with 40 parts of polycaprolactone diol having a molecular weight of 2,000, 85 parts of methyl ethyl ketone, 14 parts of triethylamine salt of dimethylolpropionic acid and 31 parts of isophorone diisocyanate. After dissolution under reflux, 0.01 part of dibutyltin dilaurate was added to carry out reaction, followed by addition of 2.4 parts of ethylenediamine for amination of the polyurethane terminals. Further, 38 parts of a bisphenol A type epoxy resin (product of Toto Kasei, YD-014) and 20 parts of methyl ethyl ketone were added. After dissolution, 0.5 part of pyridine was added to carry out reaction under reflux for 2 hours. Subsequently, 8 parts of trimellitic anhydride was added to carry out reaction under reflux for 4 hours, followed by addition of 4 parts of triethylamine, 40 parts of ethanol and 230 parts of water to give an aqueous dispersion. The dispersion was heated to 100° C. to distill off the solvents from the system, giving the final aqueous dispersion. The calculated hydroxyl group content of the resulting resin was 0.11 equivalent/100 g.

Production of Resin A-6

A glass flask equipped with a stirrer, a thermometer and a partial reflux condenser was charged with 465 parts of dimethyl terephthalate, 431 parts of dimethyl isophthalate, 37.3 parts of dimethyl 5-sodium sulfoisophthalate, 527 parts of ethylene glycol, 1230 parts of an ethylene oxide adduct of bisphenol A (Tradename "BPE20F", product of Sanyo Kasei) and 0.52 parts of tetra-n-butyl titanate. The mixture was heated from 160° C. to 220° C. for 4 hours to carry out transesterification. Then, 29 parts of fumaric acid was added, and the mixture was heated from 200° C. to 220° C. for 1 hour to carry out esterification. The reaction system was heated to 255° C. and the pressure in the system was gradually reduced, and the reaction was carried out for 1 hour under a reduced pressure of 0.2 mmHg, giving a polyester. The obtained polyester had a weight average molecular weight of 6,000, as determined by GPC.

Seventy five parts of the obtained polyester was dissolved with heating in a mixture of 50 parts of methyl ethyl ketone and 50 parts of tetrahydrofuran, and 2 parts of isophorone diisocyanate and 0.05 part of dibutyltin dilaurate were added to carry out polymerization. Subsequently, a solution of 3 parts of ethyl acrylate, 7 parts of 2-hydroxyethyl acrylate, 15 parts of acrylic acid, 1.5 parts of azobisisobutyronitrile and 4 parts of α-methylstyrene dimer in 20 parts of methyl ethyl ketone was added dropwise for 2 hours. After carrying out polymerization for 4 hours, 20 parts of triethylamine and 200 parts of water were added to disperse the polyester resin. The dispersion was gradually heated to 100° C. to distill off the solvents from the system, giving the final aqueous resin. The calculated hydroxyl group content of the resulting resin was 0.06 equivalent/100 g.

Production of Resin A-7

A reactor equipped with a stirrer, a thermometer and a reflux condenser was charged with 80 parts of polyester (product of TOYO BOSEKI KABUSHIKI KAISHA, "VYLON 260"), 100 parts of methyl ethyl ketone, 14 parts of triethylamine salt of dimethylolpropionic acid and 34 parts of isophorone diisocyanate. After dissolution under reflux, 0.01 part of dibutyltin dilaurate was added to carry out polymerization. The reaction was carried out for 4 hours, and 6 parts of glycerine was added to introduce hydroxyl groups at the terminals. Then, 30 parts of ethanol and 270 parts of water were added to give an aqueous dispersion. The dispersion was heated to 100° C. to distill off the solvents from the system, giving the final aqueous dispersion. The calculated hydroxyl group content of the resulting resin was 0.10 equivalent/100 g.

Production of Resin A-8

A reactor equipped with a stirrer, a thermometer and a reflux condenser was charged with 66 parts of a polyester (product of TOYO BOSEKI KABUSHIKI KAISHA, "VYLON 280"), 10 parts of butyl acrylate, 10 parts of methyl methacrylate, 10 parts of glycerol monomethacrylate, 4 parts of methacrylic acid and 15 parts of isopropyl alcohol, and the mixture was heated for dissolution. Then, 8 parts of styrene and 200 parts of water were added to disperse the polyester. To the dispersion was added a mixture of 2 parts of sodium styrenesulfonic acid, 1 part of potassium persulfate and 10 parts of water to carry out the reaction at 70° C. for 6 hours. The calculated amount of the hydroxyl group of the resulting resin was 0.11 equivalent/100 g.

Production of Resin A-9

A reactor equipped with a stirrer, a thermometer and a reflux condenser was charged with 100 parts of dimethylformamide, 40 parts of styrene, 40 parts of maleic anhydride and 20 parts of 2-acrylamido-2-methylpropanesulfonic acid. After dissolution, 5 parts of azobisisobutyronitrile was added to carry out the reaction at 80° C.–100° C. for 4 hours, giving a copolymer of styrene, maleic anhydride and 2-acrylamido-2-methylpropanesulfonic acid, which was then dried under reduced pressure.

Subsequently, a reactor equipped with a stirrer, a thermometer and a reflux condenser was charged with 80 parts of polyolefin polyol (product of Mitsubishi Chemical Corp., POLYTALE HA) and 100 parts of methyl ethyl ketone, and the mixture was heated for dissolution. To the solution was added 20 parts of the dried copolymer of styrene, maleic anhydride and 2-acrylamido-2-methylpropanesulfonic acid, and 0.5 part of pyridine was further added to carry out the reaction between the maleic anhydride moieties and the hydroxyl groups under reflux for 2 hours. To the reaction mixture were successively added 20 parts of triethylamine, 30 parts of ethanol and 200 parts of water to give an aqueous dispersion. The dispersion was heated to 100° C. to distill off the solvents from the system, giving the final aqueous dispersion. The calculated hydroxyl group content of the resulting resin was 0.04 equivalent/100 g.

Production of Resin A-10

A reactor equipped with a stirrer, a thermometer and a reflux condenser was charged with 40 parts of an epoxy resin (product of Toto Kasei, "YD-019") and 40 parts of methyl ethyl ketone. After dissolution, 3 parts of trimellitic anhydride was added to carry out reaction under reflux for 3 hours. Then, to the reaction system were added 30 parts of a polyester resin (product of TOYO BOSEKI KABUSHIKI KAISHA, "VYLON 260"), 3 parts of isophorone diisocyanate and 30 parts of methyl ethyl ketone, followed by heating for dissolution. Then, 0.5 part of dibutyltin dilaurate was added for polymerization. To the reaction system were successively added 3 parts of triethylamine, 20 parts of ethanol and 140 parts of water to give an aqueous dispersion. The dispersion was heated to 100° C. to distill off the solvents from the system, giving the final aqueous dispersion. The calculated hydroxyl group content of the resulting resin was 0.18 equivalent/100 g.

Production of Resin A-11

A reactor equipped with a stirrer, a thermometer and a reflux condenser was charged with 33 parts of a chlorinated polyolefin resin (product of Nippon Paper Industries Co., Ltd., "SUPERCHLONE 822") and 35 parts of styrene. After dissolution at room temperature, 20 parts of 2-hydroxyethyl methacrylate, 5 parts of methyl methacrylate, 2 parts of sodium hydroxide and 200 parts of water were added to give an aqueous dispersion of the polyolefin resin. To the dispersion was added a mixture of 2 parts of sodium styrenesulfonate, 1 part of potassium persulfate and 10 parts of water to carry out reaction at 70° C. for 6 hours. The calculated hydroxyl group content of the resulting resin was 0.18 equivalent/100 g.

Example III-1

A Zn—Ni alloy-plated steel sheet (coating weight: 30 g/m$^2$, Ni=13.9%) was roll-coated with an aqueous composition containing 70 g/l of Resin A-1, 10 g/l of manganese phosphate and 5 g/l of phosphoric acid, and the wet coating was dried at 130° C. to form a coating film in an amount of 0.50 g/m$^2$.

Example III-2

A Zn—Ni alloy-plated steel sheet (coating weight: 30 g/m$^2$, Ni=13.9%) was roll-coated with an aqueous composition containing 50 g/l of Resin A-2, 25 g/l of manganese phosphate, 25 g/l of phosphoric acid and 6 g/l of colloidal silica having a particle size of 3–4 nm, and the wet coating was dried at 130° C. to form a coating film in an amount of 0.50 g/m$^2$.

Example III-3

A Zn—Ni alloy-plated steel sheet (coating weight: 30 g/m$^2$, Ni=13.9%) was roll-coated with an aqueous composition containing 70 g/l of Resin A-3, 10 g/l of manganese phosphate and 5 g/l of phosphoric acid, and the wet coating was dried at 130° C. to form a coating film in an amount of 0.50 g/m$^2$.

Example III-4

A Zn—Ni alloy-plated steel sheet (coating weight: 30 g/m$^2$, Ni=13.9%) was roll-coated with an aqueous composition containing 50 g/l of Resin A-4, 25 g/l of manganese phosphate, 25 g/l of phosphoric acid and 12 g/l of colloidal silica having a particle size of 7–8 nm, and the wet coating was dried at 130° C. to form a coating film in an amount of 0.50 g/m$^2$.

Example III-5

A Zn—Ni alloy-plated steel sheet (coating weight: 30 g/m$^2$, Ni=13.9%) was roll-coated with an aqueous composition containing 70 g/l of Resin A-5, 10 g/l of manganese phosphate and 5 g/l of phosphoric acid, and the wet coating was dried at 130° C. to form a coating film in an amount of 0.50 g/m$^2$.

Example III-6

A Zn—Ni alloy-plated steel sheet (coating weight: 30 g/m$^2$, Ni=13.9%) was roll-coated with an aqueous composition containing 50 g/l of Resin A-6, 25 g/l of manganese phosphate and 25 g/l of phosphoric acid, and the wet coating was dried at 130° C. to form a coating film in an amount of 0.50 g/m$^2$.

Example III-7

A Zn—Ni alloy-plated steel sheet (coating weight: 30 g/m², Ni=13.9%) was roll-coated with an aqueous composition containing 70 g/l of Resin A-7, 10 g/l of manganese phosphate, 5 g/l of phosphoric acid, 6 g/l of colloidal silica having a particle size of 2–3 nm and 1.0 g/l of MgO having a particle size of 10–12 nm, and the wet coating was dried at 130° C. to form a coating film in an amount of 0.50 g/m².

Example III-8

A Zn—Ni alloy-plated steel sheet (coating weight: 30 g/m², Ni=13.9%) was roll-coated with an aqueous composition containing 50 g/l of Resin A-8, 25 g/l of manganese phosphate, 25 g/l of phosphoric acid and 15 g/l of colloidal silica having a particle size of 7–9 nm, and the wet coating was dried at 130° C. to form a coating film in an amount of 0.50 g/m².

Example III-9

A Zn—Ni alloy-plated steel sheet (coating weight: 30 g/m², Ni=13.9%) was roll-coated with an aqueous composition containing 50 g/l of Resin A-9, 25 g/l of manganese phosphate and 25 g/l of phosphoric acid, and the wet coating was dried at 130° C. to form a coating film having a coating amount of 0.50 g/m².

Example III-10

A Zn—Ni alloy-plated steel sheet (coating weight: 30 g/m², Ni=13.9%) was roll-coated with an aqueous composition containing 70 g/l of Resin A-10, 10 g/l of manganese phosphate, 5 g/l of phosphoric acid and 12 g/l of colloidal silica having a particle size of 10–12 nm, and the wet coating was dried at 130° C. to form a coating film in an amount of 0.50 g/m².

Example III-11

A Zn—Ni alloy-plated steel sheet (coating weight: 30 g/m², Ni=13.9%) was roll-coated with an aqueous composition containing 50 g/l of Resin A-11, 25 g/l of manganese phosphate and 25 g/l of phosphoric acid, and the wet coating was dried at 130° C. to form a coating film in an amount of 0.50 g/m².

Preparation of Resin B-1

A glass flask equipped with a stirrer, a thermometer and a partial reflux condenser was charged with 730 parts of adipic acid, 401 parts of neopentyl glycol, 443 parts of ethylene glycol and 0.52 part of tetra-n-butyl titanate. The esterification reaction was carried out by elevating the temperature from 160° C. to 240° C. for 5 hours, and the reaction system was maintained at 230° C. and the pressure of the reaction system was gradually reduced. The reaction was continued under a reduced pressure of 0.2 mmHg for 1 hour. After addition of 19.2 parts of trimellitic anhydride, the reaction was further continued at 220° C. for 30 minutes. The weight average molecular weight of the polyester thus obtained was 15000, as measured by GPC.

This polyester (100 parts) was placed together with 100 parts of methyl ethyl ketone and 30 parts of isopropyl alcohol into a reactor equipped with a thermometer, a stirrer and a reflux condenser. After these compounds were dissolved with heating, 4 parts of triethylamine and 200 parts of water were added to obtain an aqueous dispersion of the polyester resin. The dispersion was gradually heated to 100° C. to distill off the solvents from the system, thus giving a final aqueous resin dispersion. The calculated hydroxyl group content of the resulting resin dispersion was 0 equivalent/100 g.

Preparation of Resin B-2

A reactor equipped with a thermometer, a stirrer and a reflux condenser was charged with 100 parts of dimethylformamide, 40 parts of styrene, 40 parts of maleic anhydride and 20 parts of 2-acrylamido-2-methylpropanesulfonic acid. After these components were dissolved, 5 parts of azobisisobutyronitrile was added and the reaction was carried out at 80–100° C. for 4 hours, thus giving a copolymer of styrene, maleic anhydride and 2-acrylamido-2-methylpropanesulfonic acid. This copolymer was dried under reduced pressure.

Into a reactor equipped with a thermometer, a stirrer and a reflux condenser were placed 100 parts of the dried styrene/maleic anhydride/2-acrylamido-2-methylpropanesulfonic acid copolymer, 20 parts of triethylamine and 200 parts of water in this order, and the mixture was heated to provide a final aqueous dispersion. The calculated hydroxyl group content of the resulting resin was 0 equivalent/100 g.

Preparation of Resin B-3

A glass flask equipped with a stirrer, a thermometer and a partial reflux condenser was charged with 90 parts of ethyl acrylate, 160 parts of acrylic acid and 10 parts of a-methylstyrene dimer. A solution of 15 parts of azobisisobutyronitrile in 300 parts of methyl ethyl ketone was added dropwise for 2 hours and the polymerization was carried out for 4 hours. Then, 20 parts of triethylamine, 30 parts of isopropyl alcohol and 200 parts of water were added thereto, and the reaction system was gradually heated to 100° C. to distill off the solvents from the system, thus giving a final aqueous resin. The calculated hydroxyl group content of the resulting resin was 0 equivalent/100 g.

Comparative Example III-1

A Zn—Ni alloy-plated steel sheet (coating weight: 30 g/m², Ni=13.9%) was roll-coated with an aqueous composition containing 70 g/l of Resin B-1, 10 g/l of manganese phosphate and 5 g/l of phosphoric acid, and the wet coating was dried at 130° C. to form a coating film in an amount of 0.50 g/m².

Comparative Example III-2

A Zn—Ni alloy-plated steel sheet (coating weight: 30 g/m², Ni=13.9%) was roll-coated with an aqueous composition containing 50 g/l of Resin B-2, 25 g/l of manganese phosphate and 25 g/l of phosphoric acid, and the wet coating was dried at 130° C. to form a coating film in an amount of 0.50 g/m².

Comparative Example III-3

A Zn—Ni alloy-plated steel sheet (coating weight: 30 g/m², Ni=13.9%) was roll-coated with an aqueous composition containing 70 g/l of Resin B-3, 10 g/l of manganese phosphate and 5 g/l of phosphoric acid, and the wet coating was dried at 130° C. to form a coating film in an amount of 0.50 g/m².

TABLE 5

| | Adhesion of coating film to substrate | Post-processing bare corrosion resistance (salt spraying time: hours) | | | | | | | | | Overcoat adhesion |
|---|---|---|---|---|---|---|---|---|---|---|---|
| | | 100 | 200 | 400 | 600 | 1000 | 1500 | 2000 | 3000 | 4000 | |
| Ex. III-1 | A | A | A | A | A | A | B | C | D | D | A |
| Ex. III-2 | A | A | A | A | A | A | A | A | B | C | A |
| Ex. III-3 | A | A | A | A | A | A | A | B | B | C | A |
| Ex. III-4 | A | A | A | A | A | A | A | A | B | C | A |
| Ex. III-5 | A | A | A | A | A | A | A | B | B | C | A |
| Ex. III-6 | A | A | A | A | A | A | A | A | B | D | A |
| Ex. III-7 | A | A | A | A | A | A | A | B | C | D | A |
| Ex. III-8 | A | A | A | A | A | A | A | A | B | C | A |
| Ex. III-9 | A | A | A | A | A | A | B | C | D | D | A |
| Ex. III-10 | A | A | A | A | A | A | A | A | B | D | A |
| Ex. III-11 | A | A | A | A | A | B | C | D | D | D | A |
| Comp. Ex. III-1 | D | A | B | C | D | D | D | D | D | D | D |
| Comp. Ex. III-2 | D | D | D | D | D | D | D | D | D | D | D |
| Comp. Ex. III-3 | D | D | D | D | D | D | D | D | D | D | D |

We claim:

1. A chromium-free composition for treating the surface of metals, the composition comprising:
   (a) a hydroxyl group-containing organic resin;
   (b) a phosphoric acid; and
   (c) a metal ion or metal compound capable of supplying ions in the composition, the metal being at least one metal selected from the group consisting of Cu, Co, Fe, Mn, Sn, V, Mg, Ba, Al, Ca, Sr, Nb, Y and Zn,
wherein the composition comprises from about 2 to about 50 parts by weight of the phosphoric acid by 100 parts by weight of the hydroxyl group-containing organic resin, and the composition further comprises at least one colloid, sol, or powder selected from the group consisting of $SiO_2$, $Fe_2O_3$, $Fe_3O_4$, MgO, $ZrO_2$, $SnO_2$, $Al_2O_3$ and $Sb_2O_5$ said composition being effective to provide corrosion resistance to a metal when applied to the surface of said metal in an amount to provide a coating weight of from about 0.1 g/m$^2$ to about 3.0 g/m$^2$ on dry basis.

2. The composition according to claim 1, wherein the composition, when applied to a Zn-plated steel sheet and dried, form a coating film which has an ability to remain unremoved from the steel sheet after immersion in boiling water for 30 minutes.

3. The composition according to claim 1, wherein the metal ion or metal compound as component (c) is a phosphoric acid compound of said metal.

4. The composition according to claim 1, wherein the hydroxyl group-containing organic resin contains at least one hydroxyl (OH) group, or at least one hydroxyl (OH) group and at least one of glycidyl, aldehyde and amino groups, in an amount of at least 0.04 equivalent per 100 g of the hydroxyl group-containing organic resin.

5. The composition according to claim 1, which contains, per 100 g of the hydroxyl group-containing organic resin, 2 to 50 g of the phosphoric acid and 0.015 to 1.5 gram molecules of a phosphoric acid compound of said metal.

6. The composition according to claim 1, wherein the colloid or sol or the powder has a particle size of 1 to 30 nm.

7. The composition according to claim 1, wherein the colloid or sol or the powder is used in an amount of 3 to 300 parts by weight per 100 parts by weight of the hydroxyl group-containing organic resin.

8. A surface-treated metal sheet comprising
   (i) a member selected from the group consisting of a metal sheet, a metal-plated steel sheet and a metal alloy-plated steel sheet, and
   (ii) a coating film formed on the surface of said member (i) by applying the surface-treating composition of claim 1 to the surface of said member, followed by drying, wherein said coating film has a coating weight of 0.1 to 3.0 g/m$^2$ on dry basis.

9. A surface-treated metal sheet comprising
   (i) a member selected from the group consisting of a metal sheet, a metal-plated steel sheet and a metal alloy-plated steel sheet,
   (ii) a corrosion-resistant coating film formed on said member (i), and
   (iii) a coating film of an organic resin formed on the corrosion-resistant coating film (ii),
wherein the corrosion-resistant coating film (ii) is formed by applying the surface-treating composition of claim 1 to the surface of said member (i),
wherein the organic resin contained in coating film (iii) is at least one resin selected from the group consisting of an organic resin prepared by copolymerization of at least two members selected from the group consisting of methyl methacrylate, butyl acrylate, styrene, glycidyl methacrylate, methacrylic acid, acrylic acid, organic phosphorus monomer and hydroxyethyl acrylate; olefin/acrylic acid copolymer resins; polyacrylic acid and copolymer resins thereof; polyacrylic acid ester and copolymer resins thereof; polymethacrylic acid ester and copolymer resins thereof; epoxy resin; acryl-modified epoxy resins; ester-modified epoxy resins; urethane-modified epoxy resins; urethane-modified epoxy ester resins; vinyl-modified epoxy resins and vinyl-modified epoxy ester resins, and
wherein the coating film of the organic resin (iii) has a coating weight of 0.2 to 3.0 g/m$^2$ on dry basis.

10. A surface-treated metal sheet comprising
   (i) a member selected from the group consisting of a metal sheet, a metal-plated steel sheet and a metal alloy-plated steel sheet,
   (ii) a corrosion-resistant coating film formed on said member, and
   (iii) a coating film of a coating composition which comprises an organic resin and a colloid or sol or a powder and which is formed on the corrosion-resistant coating film (ii),
wherein the corrosion-resistant coating film (ii) is formed by applying the surface-treating composition of claim 1 to the surface of said member (i), wherein the organic resin contained in the coating composition for forming the coating film (iii) is at least one resin selected from the group consisting of an organic resin prepared by copolymerization of at least two members selected from the group consisting of methyl methacrylate, butyl acrylate, styrene, glycidyl methacrylate, methacrylic acid, acrylic acid, organic phosphorus monomer and hydroxyethyl acrylate; olefin/acrylic acid copolymer resins; polyacrylic acid and copolymer resins thereof; polyacrylic acid ester and copolymer resins thereof; polymethacrylic acid ester and copolymer resins thereof; epoxy resin; acryl-modified epoxy resin; ester-modified epoxy resin; urethane-modified epoxy resin; urethane-modified epoxy ester resin; vinyl-modified epoxy resin and vinyl-modified epoxy ester resin, and wherein the colloid or sol or the powder contained in the coating composition for forming the coating film (iii) is used in an amount of 10 to 60 parts by weight, per 100 parts by weight of the organic resin, and wherein the colloid or sol or powder is selected from the group consisting of $SiO_2$, $Fe_2O_3$, $Fe_3O_4$, $MgO$, $ZrO_2$, $SnO_2$, $Al_2O_3$ and $Sb_2O_5$, and wherein the coating film (iii) of the coating composition has a coating weight of 0.2 to 3.0 $g/m^2$ on dry basis.

11. A surface-treated metal article comprising (i) a metal substrate, (ii) a corrosion-resistant coating film formed on said metal substrate, wherein the corrosion-resistant coating film (ii) is formed by applying the surface-treating composition of claim 1 to the metal substrate (i), followed by drying.

12. A surface-treated metal article comprising (i) a metal substrate, (ii) a corrosion-resistant coating film formed on said metal substrate, and (iii) a coating film of a coating composition which comprises an organic resin and if desired a colloid or sol or a powder and which is formed on the corrosion-resistant coating film (ii), wherein the corrosion-resistant coating film (ii) is formed by applying the surface-treating composition of claim 1 to the metal substrate (i), followed by drying, wherein the organic resin contained in the coating composition for forming the coating film (iii) is at least one member selected from the group consisting of an organic resin prepared by copolymerization of at least two members selected from the group consisting of methyl methacrylate, butyl acrylate, styrene, glycidyl methacrylate, methacrylic acid, acrylic acid, organic phosphorus monomer and hydroxyethyl acrylate; olefin/acrylic acid copolymer resins; polyacrylic acid and copolymer resins thereof; polyacrylic acid ester and copolymer resins thereof; polymethacrylic acid ester and copolymer resins thereof; epoxy resin; acryl-modified epoxy resin; ester-modified epoxy resin; urethane-modified epoxy resin; urethane-modified epoxy ester resin; vinyl-modified epoxy resin and vinyl-modified epoxy ester resin, and wherein the colloid or sol or the powder, if contained in the coating composition for forming the coating film (iii), is used in an amount of 10 to 60 parts by weight, per 100 parts of the organic resin, and wherein the colloid or sol or powder is selected from the group consisting of $SiO_2$, $Fe_2O_3$, $Fe_3O_4$, $MgO$, $ZrO_2$, $SnO_2$, $Al_2O_3$ and $Sb_2O_5$, and wherein the coating film (iii) of the coating composition has a coating weight of 0.2 to 3.0 $g/m^2$ on dry basis.

* * * * *